March 17, 1925.
R. P. M. DAVIS ET AL
1,529,692
MACHINE FOR AND METHOD OF MAKING BRICK
Filed Oct. 21, 1922     31 Sheets-Sheet 1
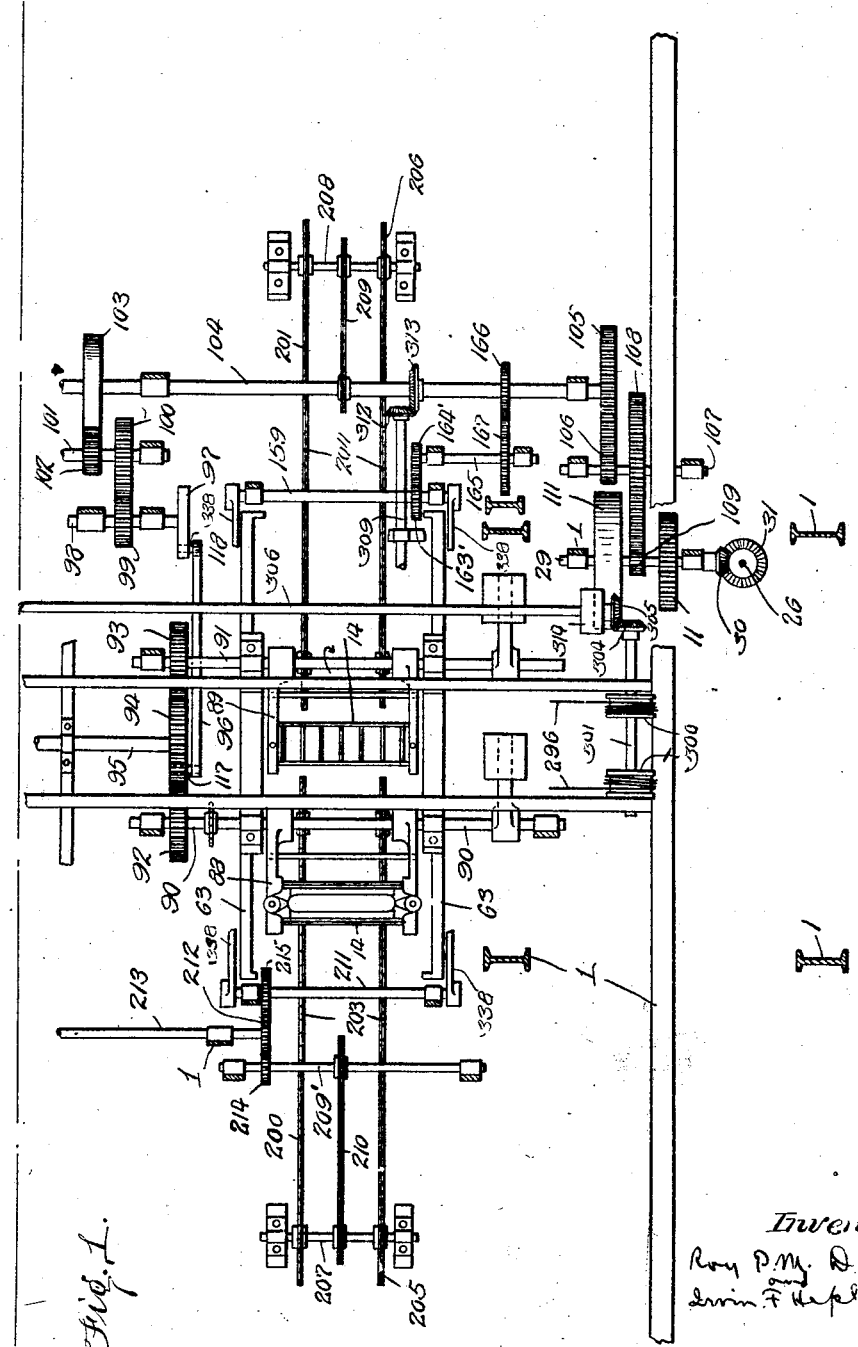

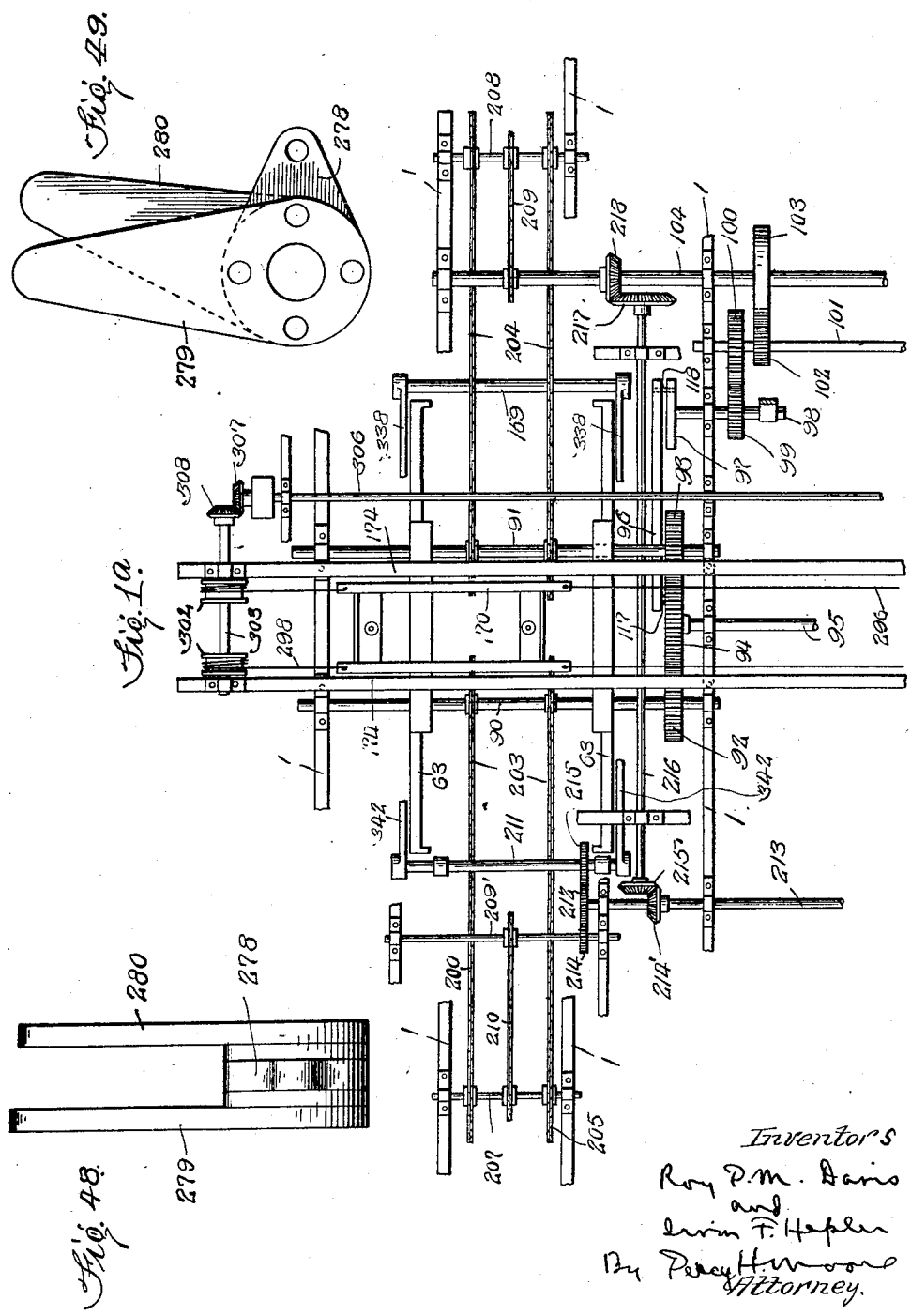

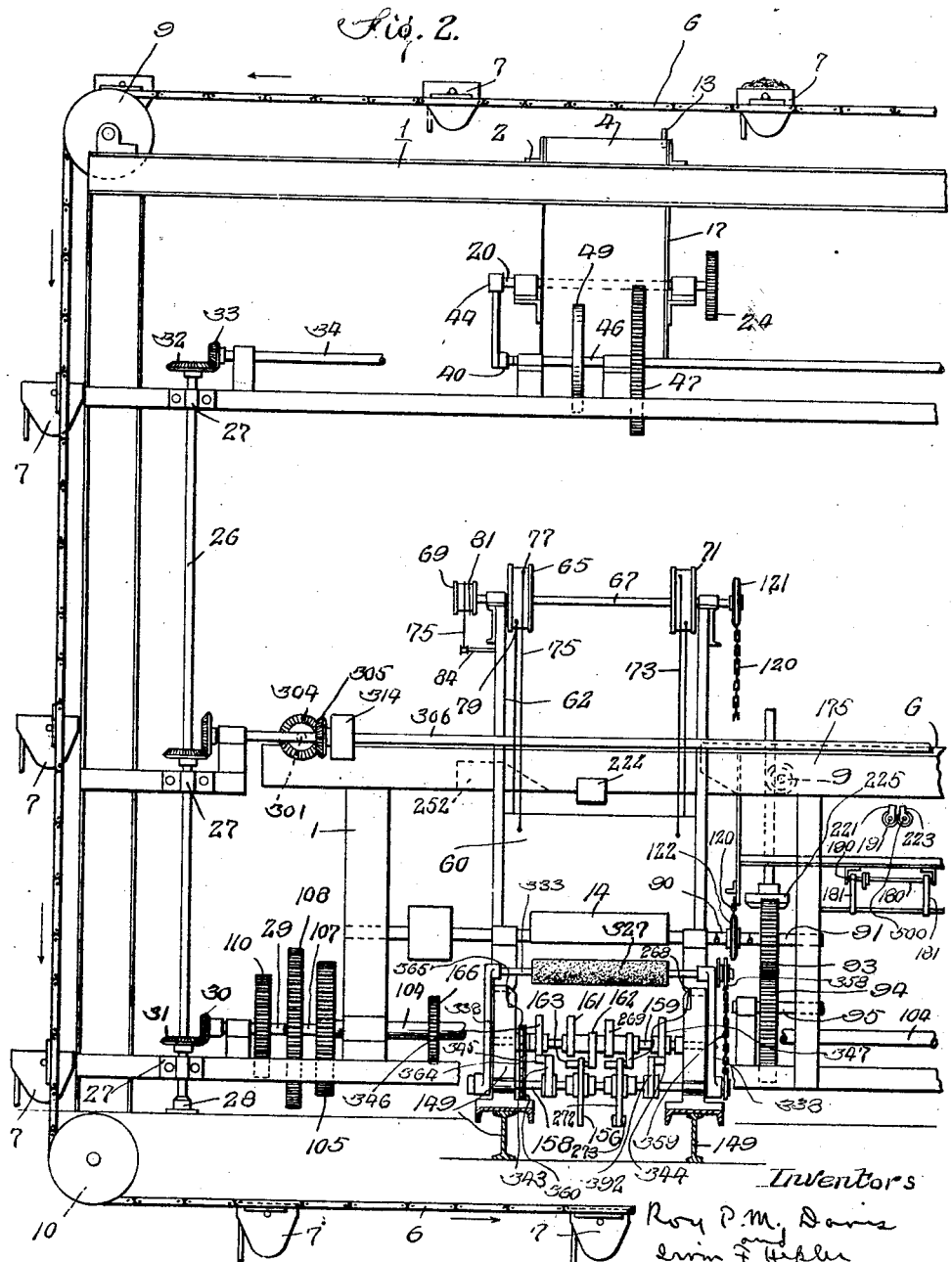

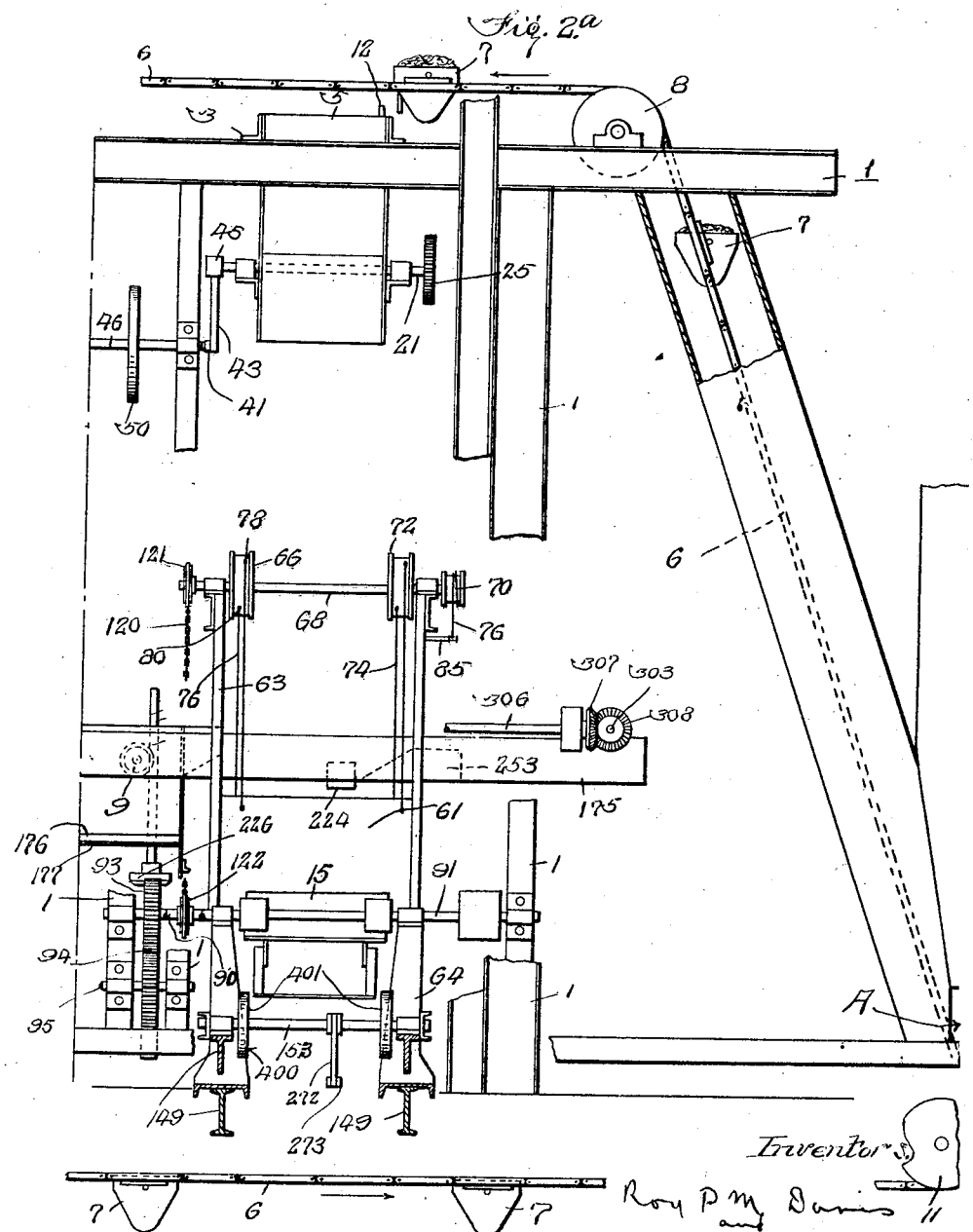

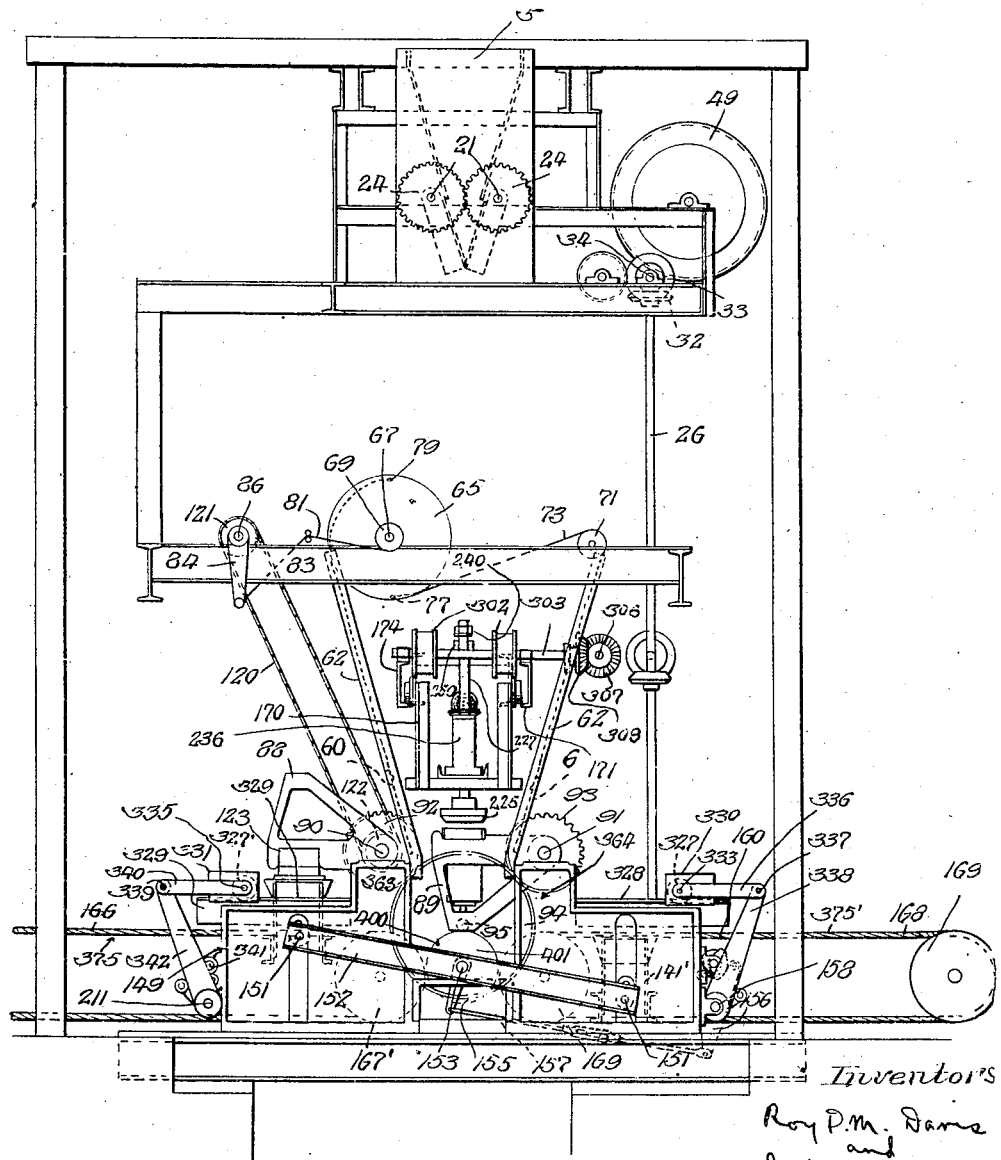

March 17, 1925.
R. P. M. DAVIS ET AL
1,529,692
MACHINE FOR AND METHOD OF MAKING BRICK
Filed Oct. 21, 1922   31 Sheets-Sheet 6
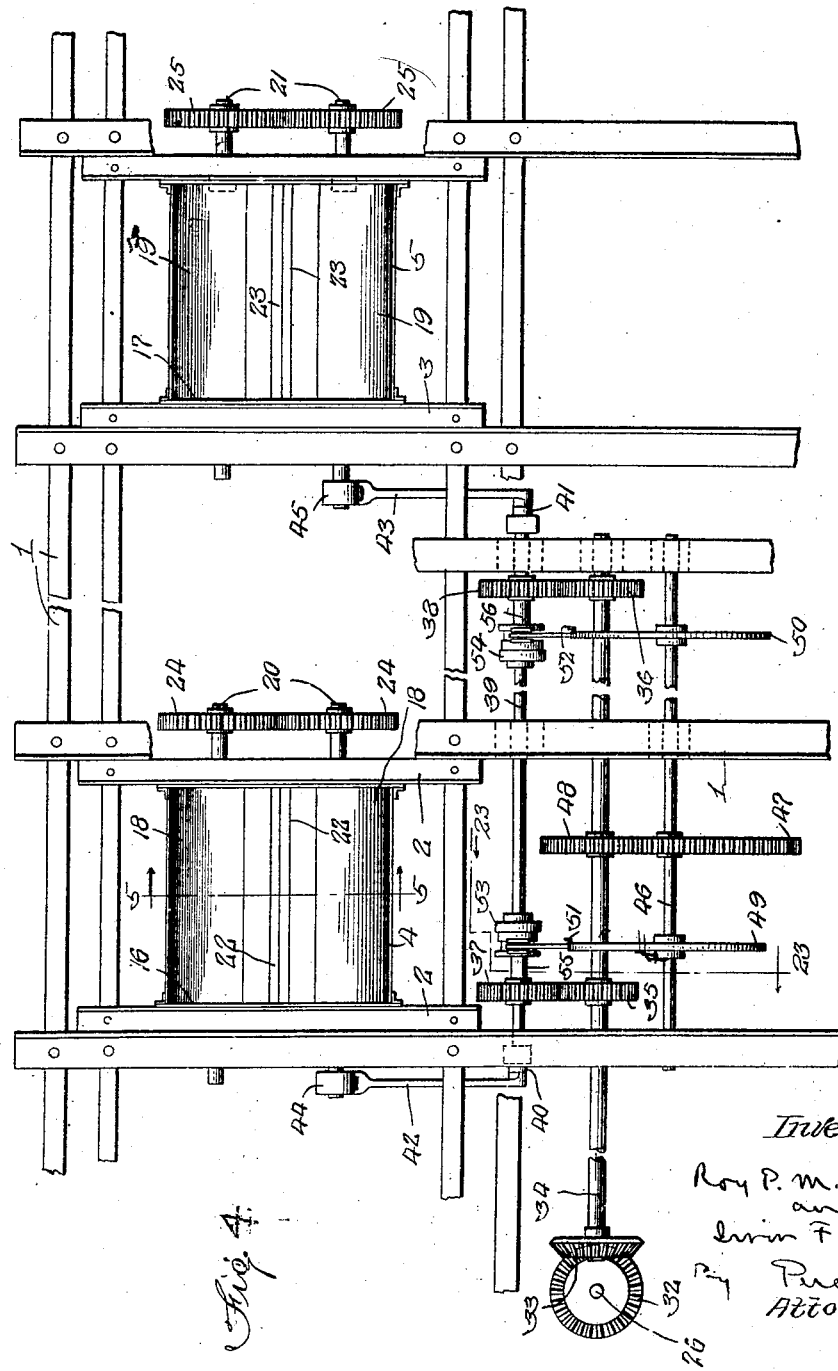

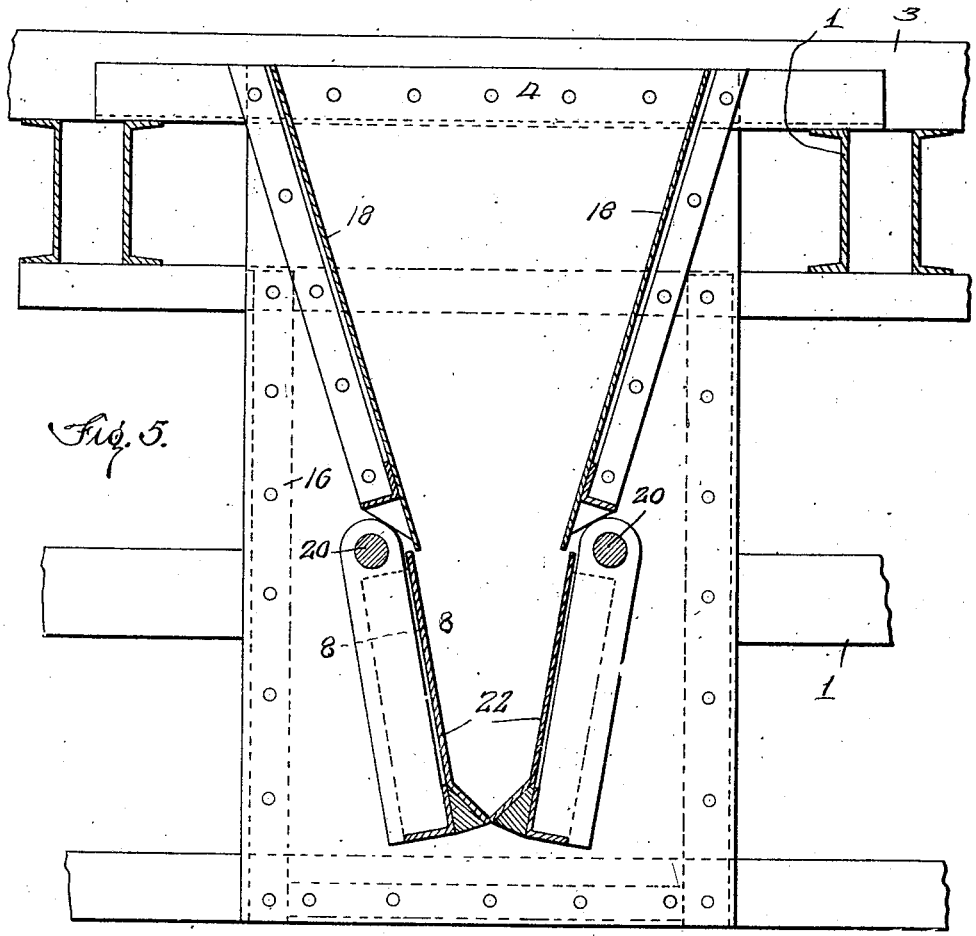
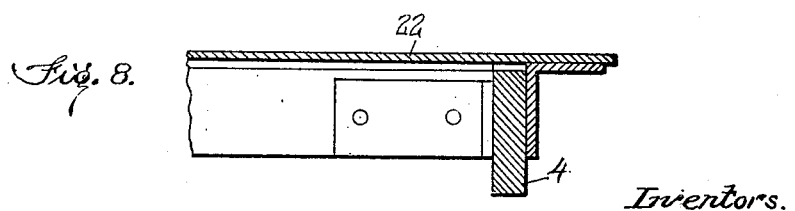

March 17, 1925.
R. P. M. DAVIS ET AL
1,529,692
MACHINE FOR AND METHOD OF MAKING BRICK
Filed Oct. 21, 1922 31 Sheets-Sheet 8
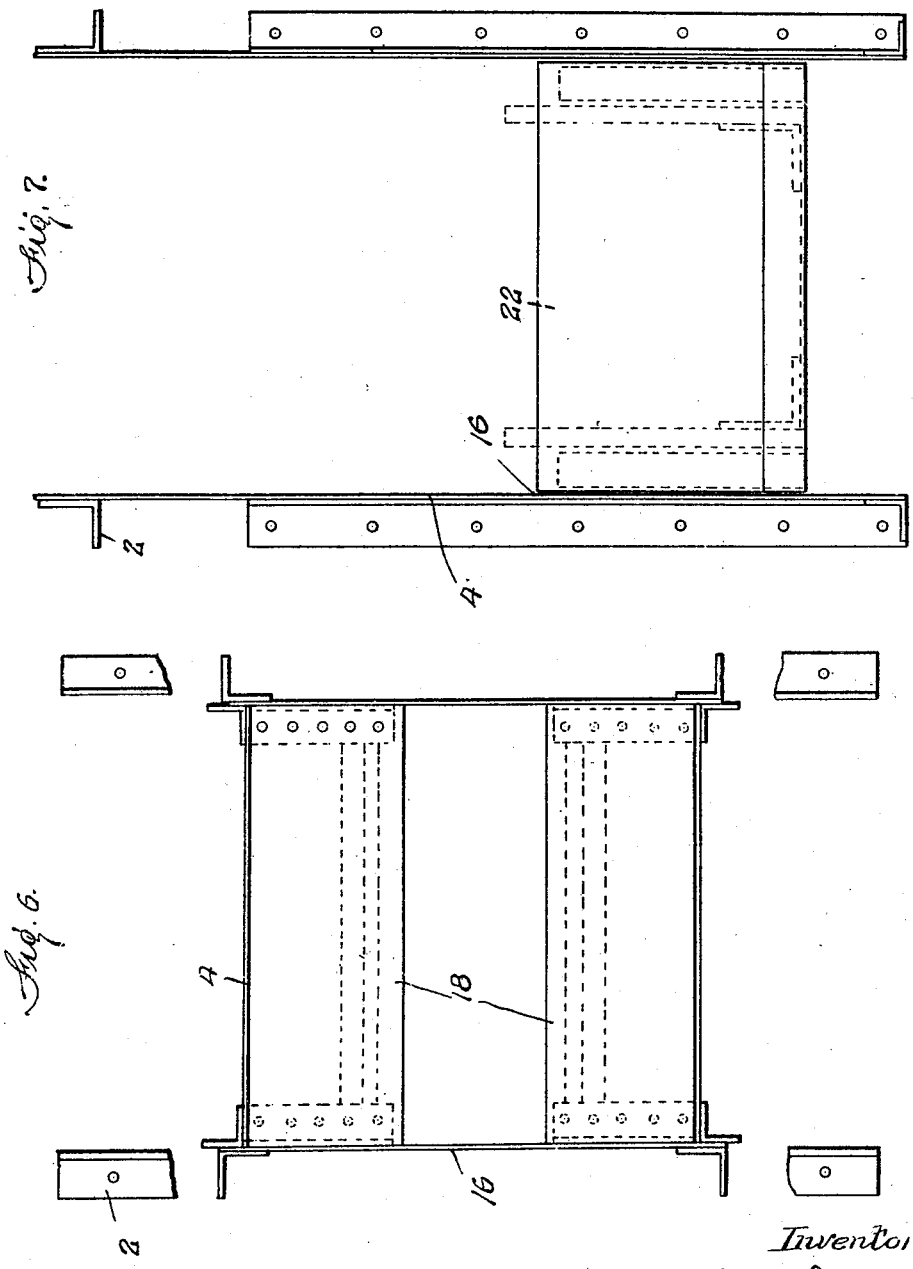

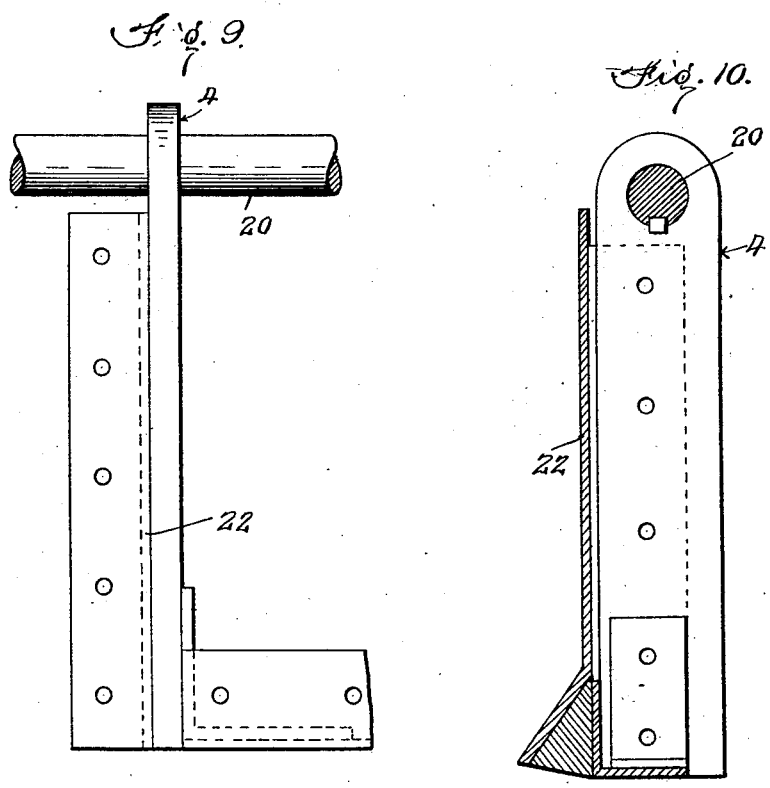
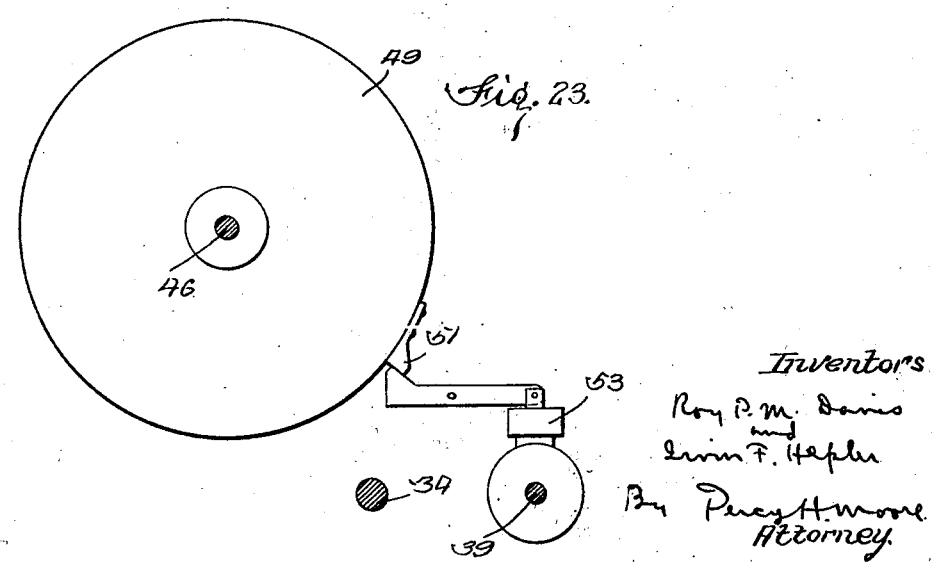

March 17, 1925.
R. P. M. DAVIS ET AL
1,529,692
MACHINE FOR AND METHOD OF MAKING BRICK
Filed Oct. 21, 1922    31 Sheets-Sheet 10
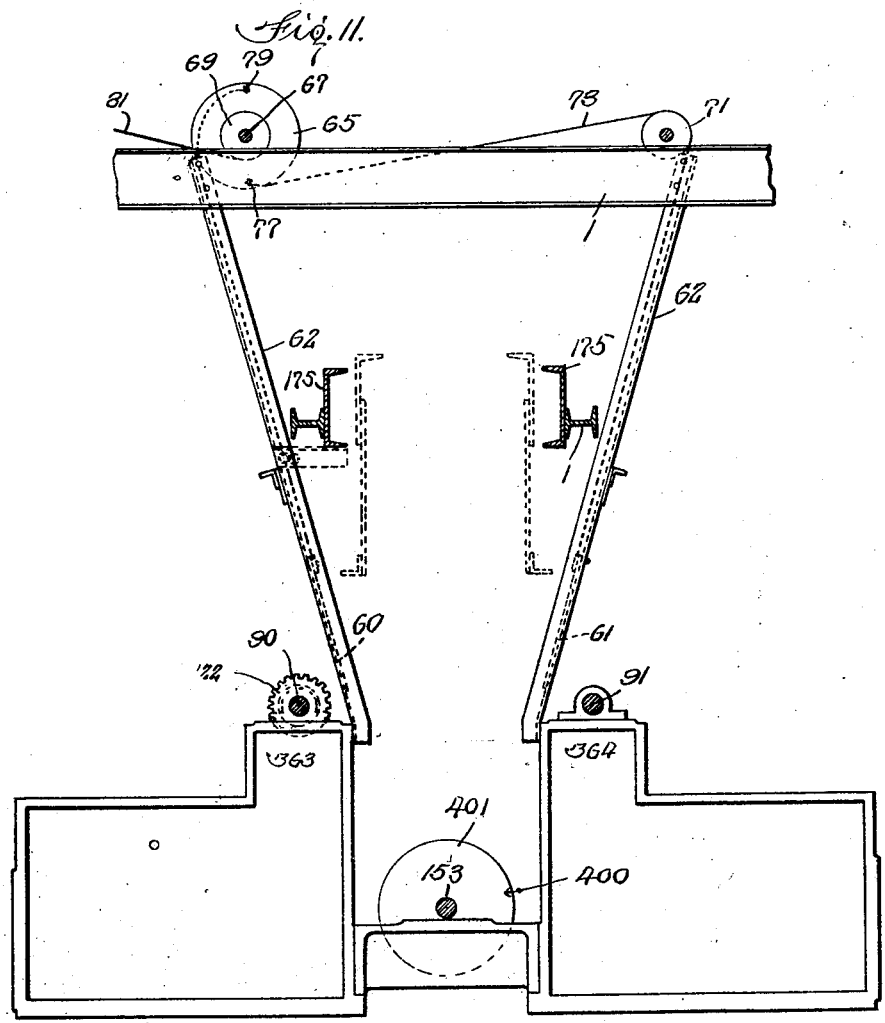
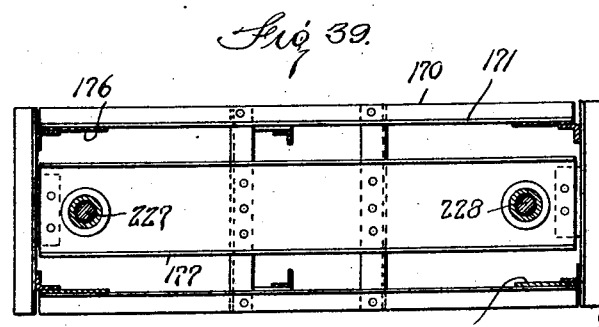

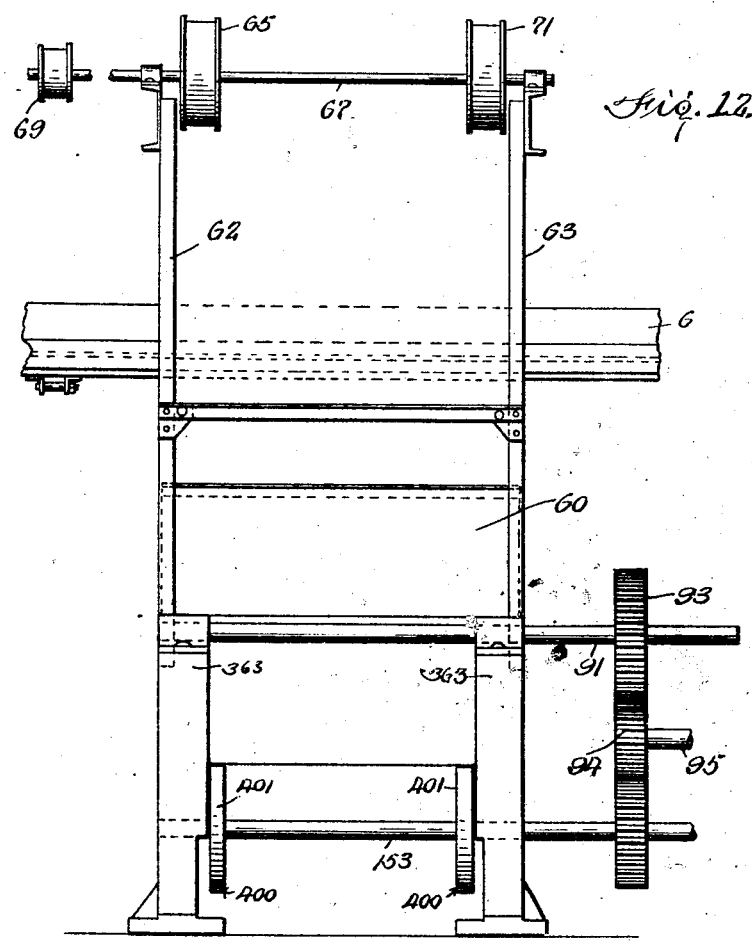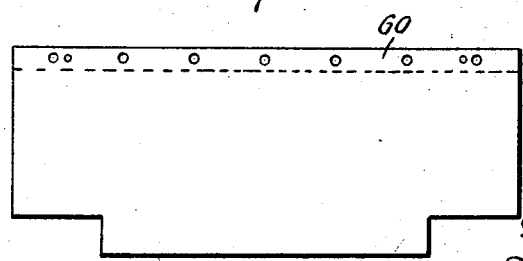

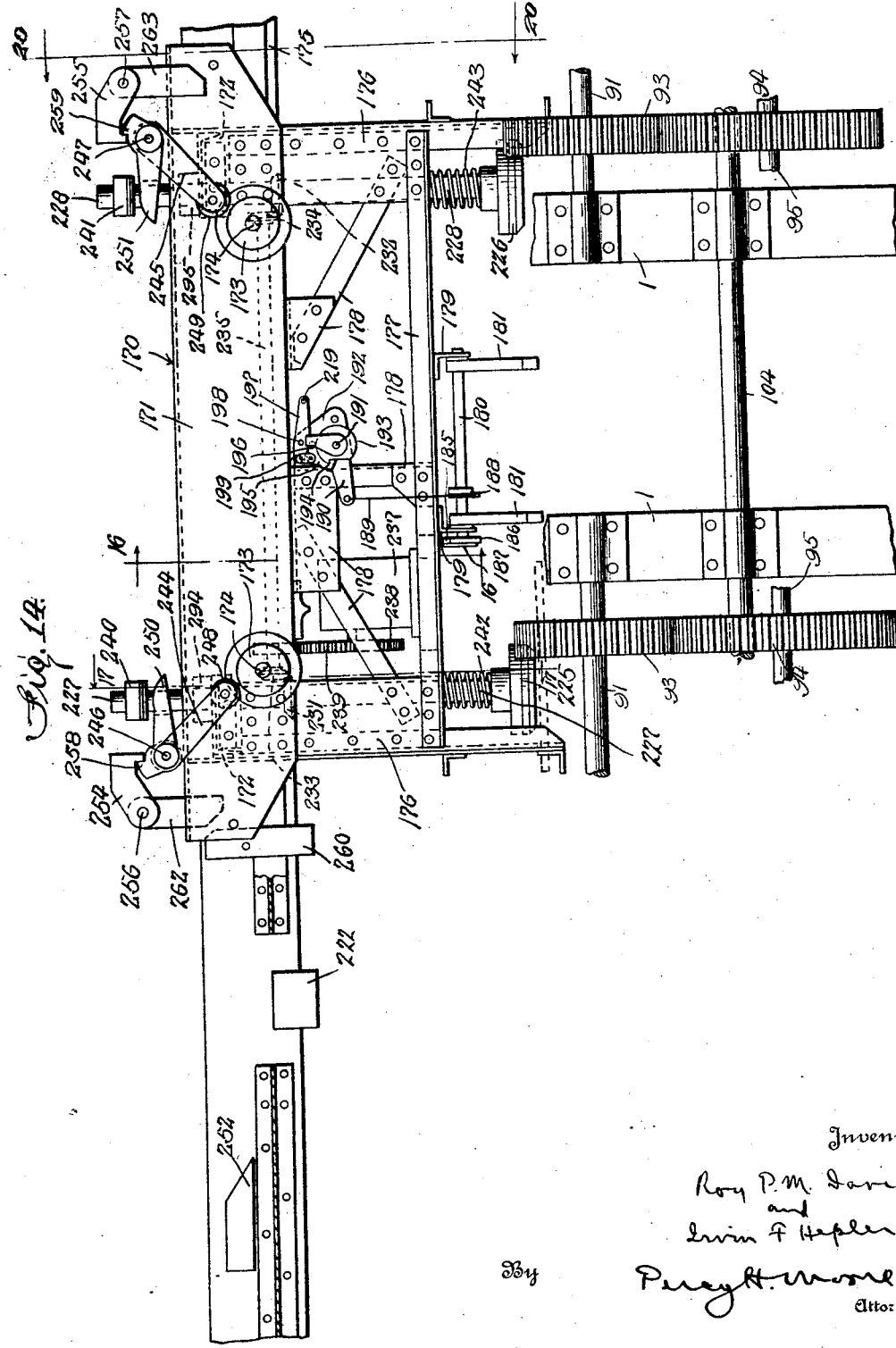

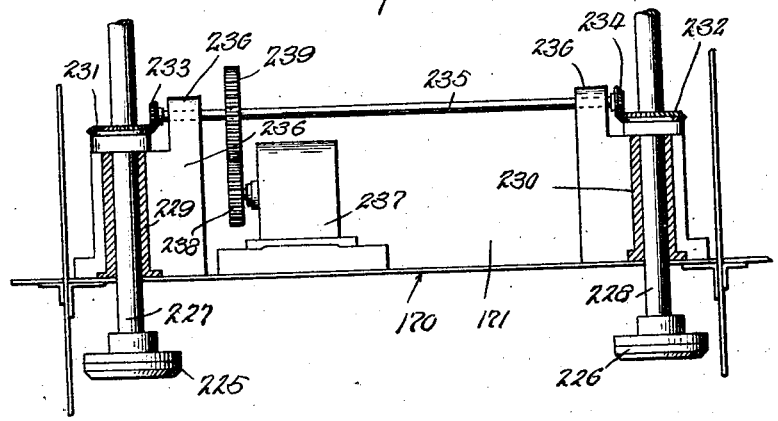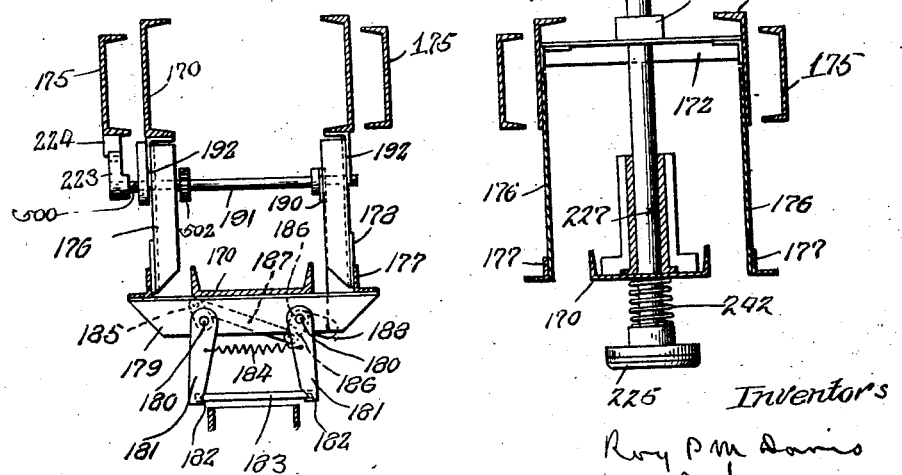

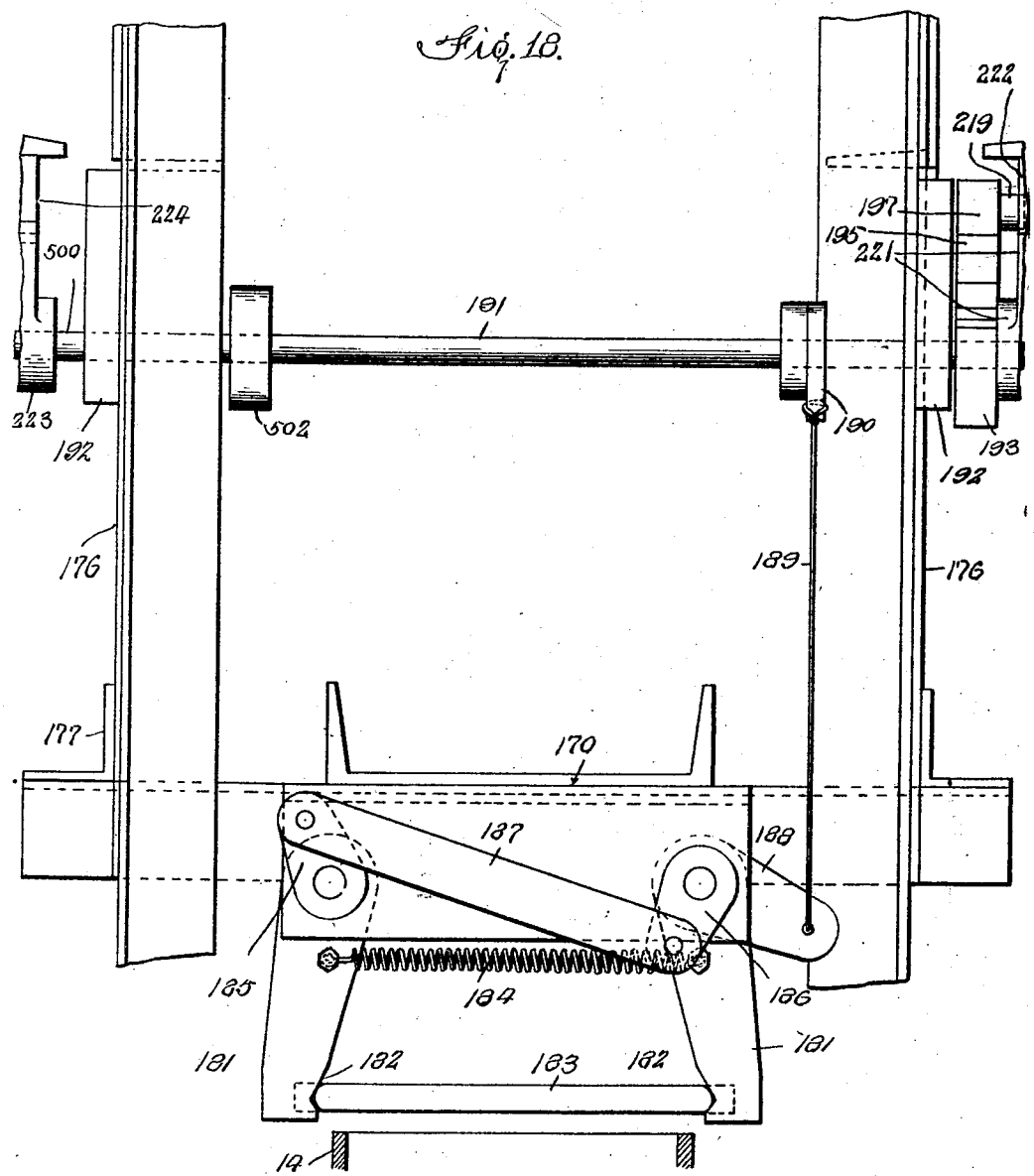

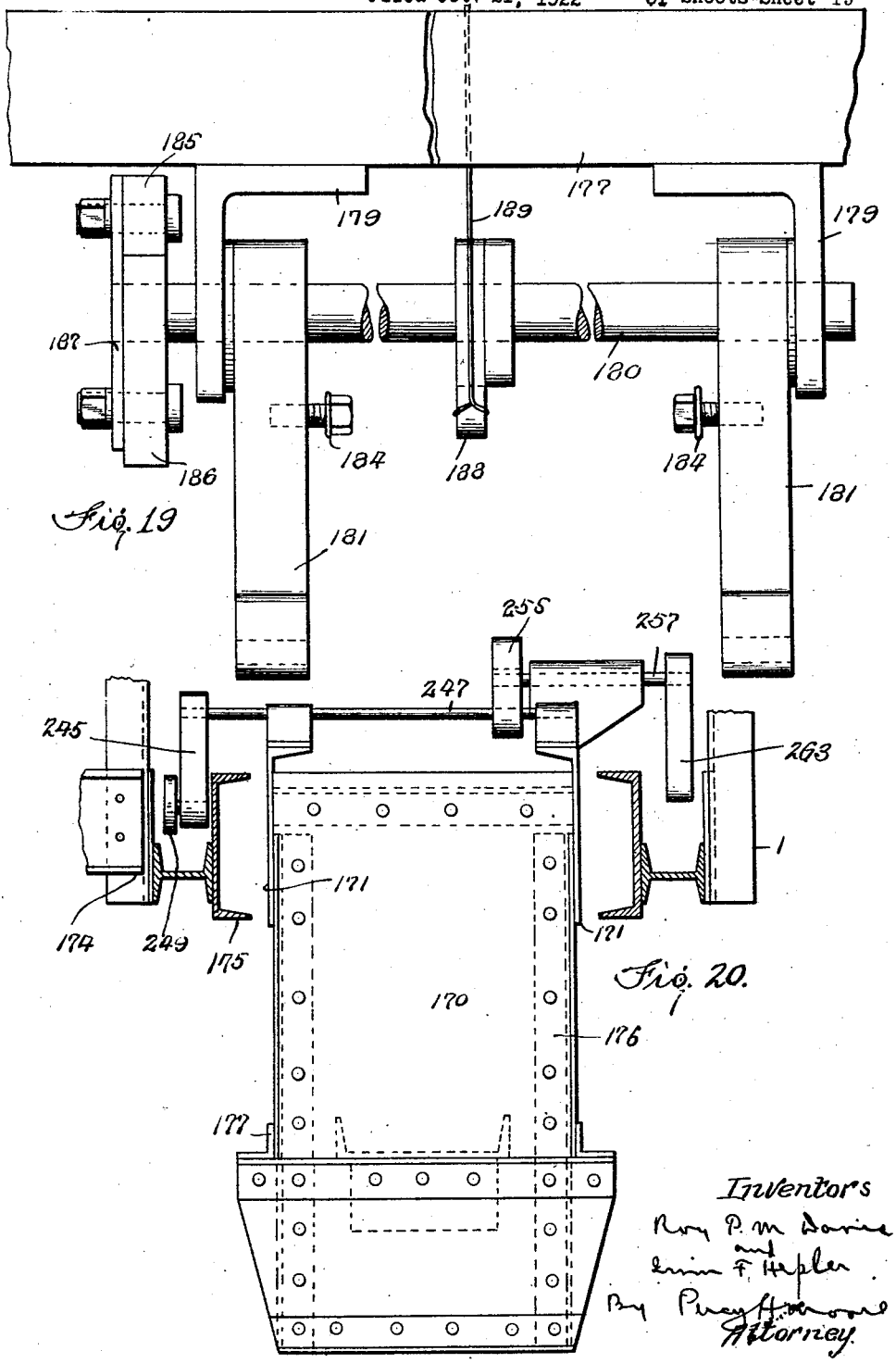

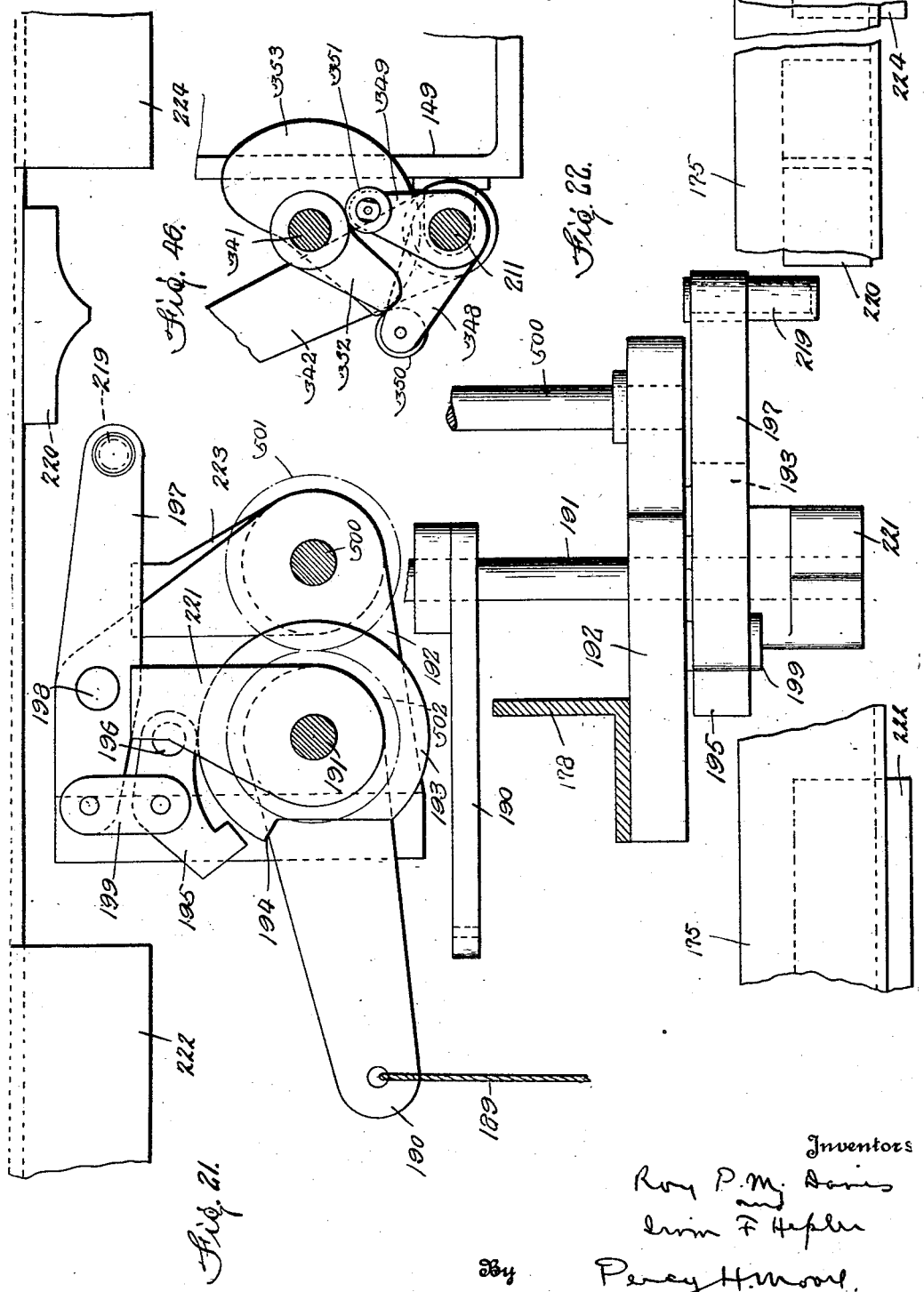

March 17, 1925.
R. P. M. DAVIS ET AL
1,529,692
MACHINE FOR AND METHOD OF MAKING BRICK
Filed Oct. 21, 1922   31 Sheets-Sheet 17
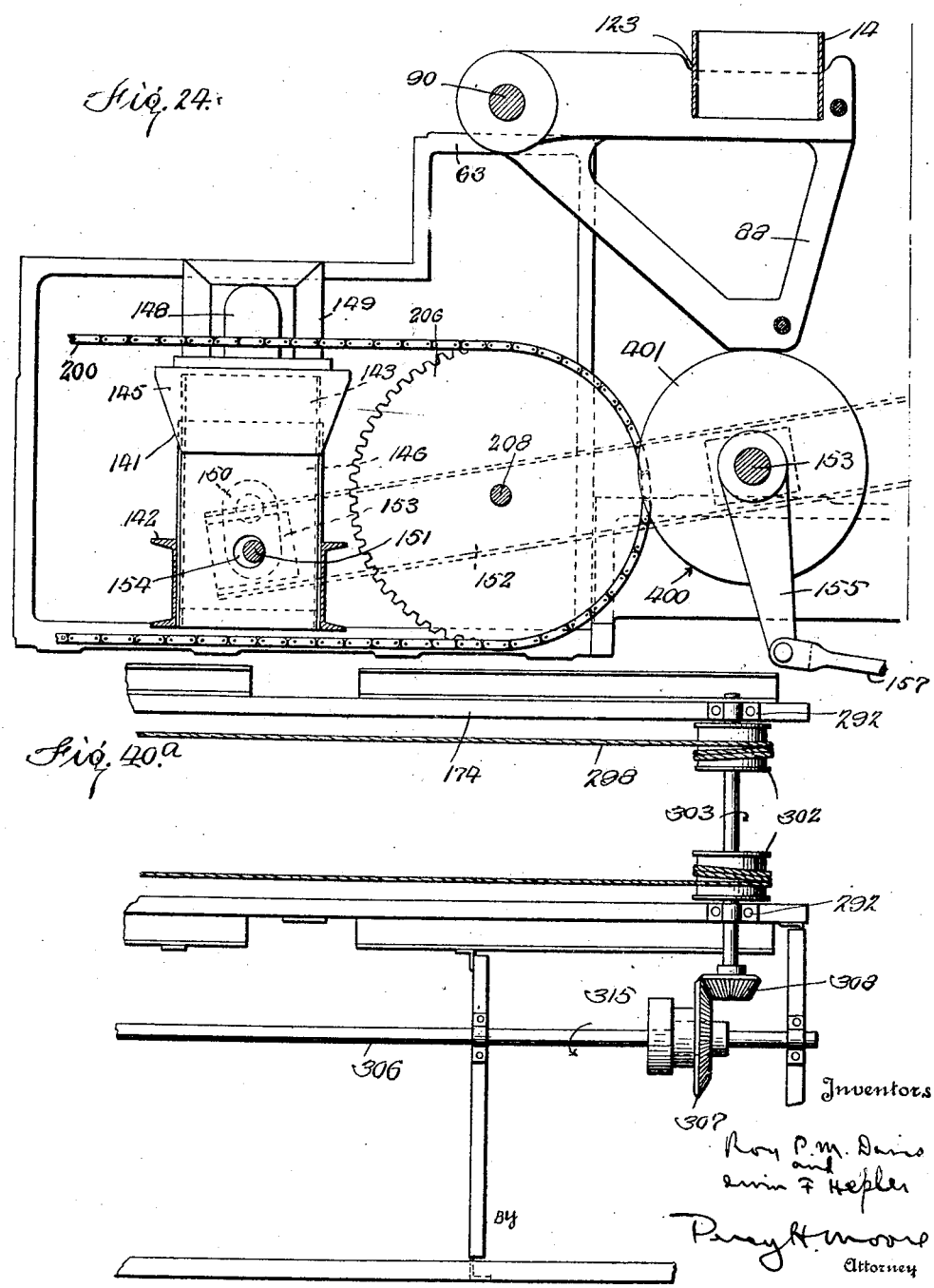

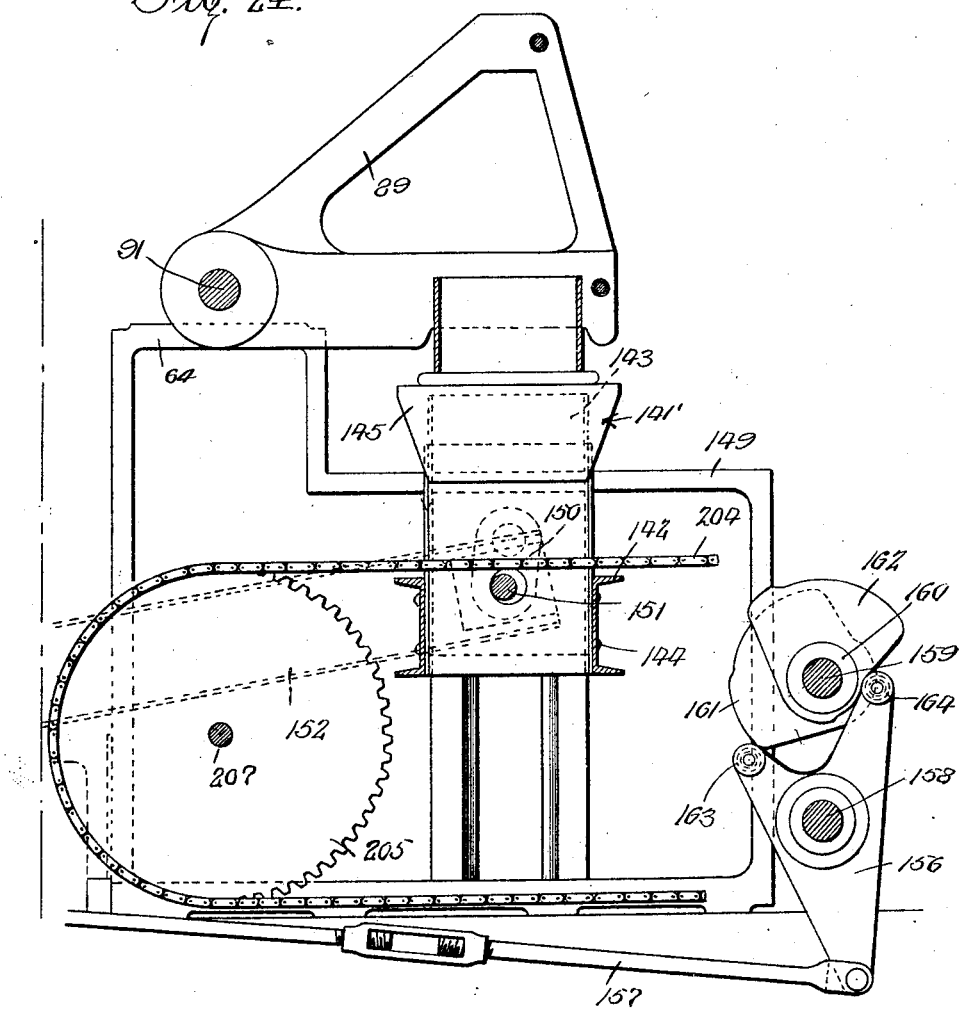

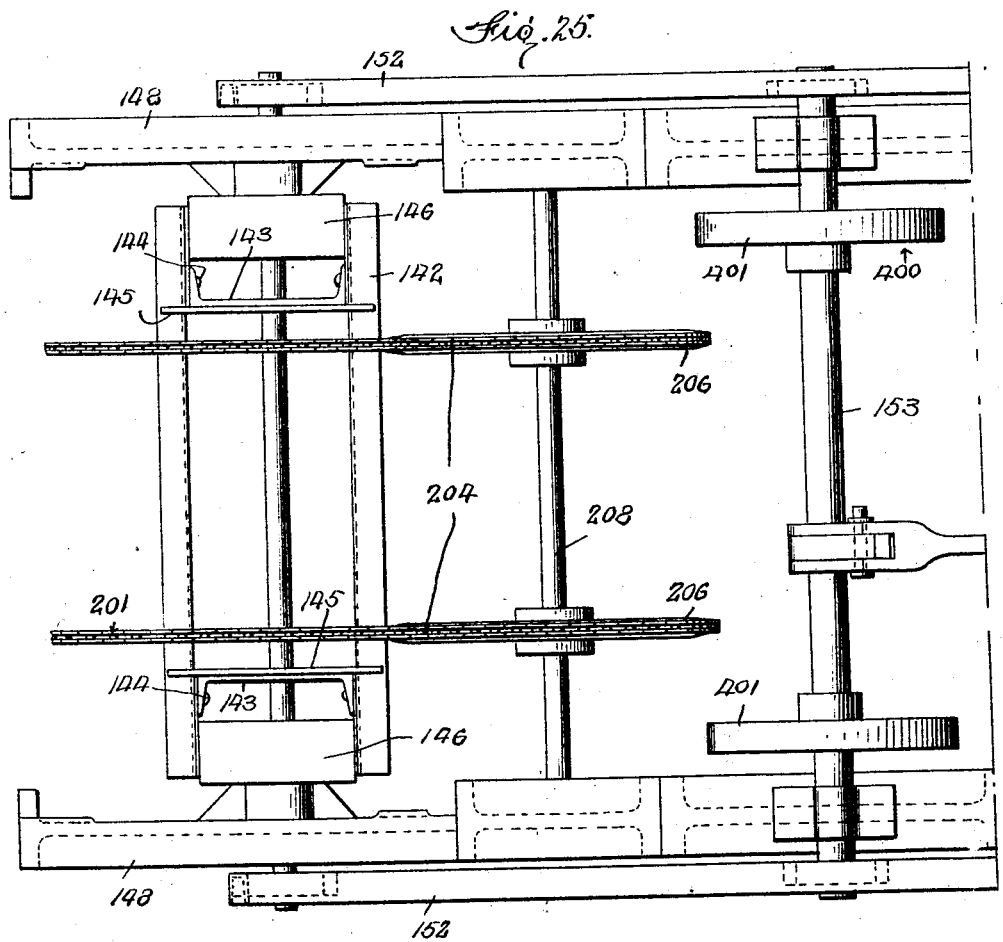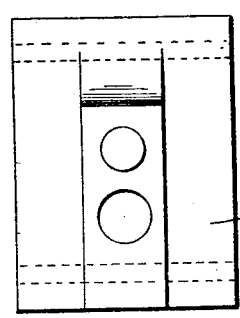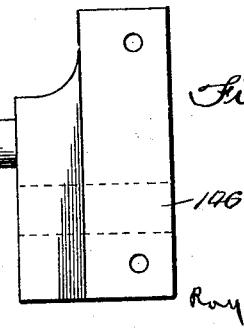

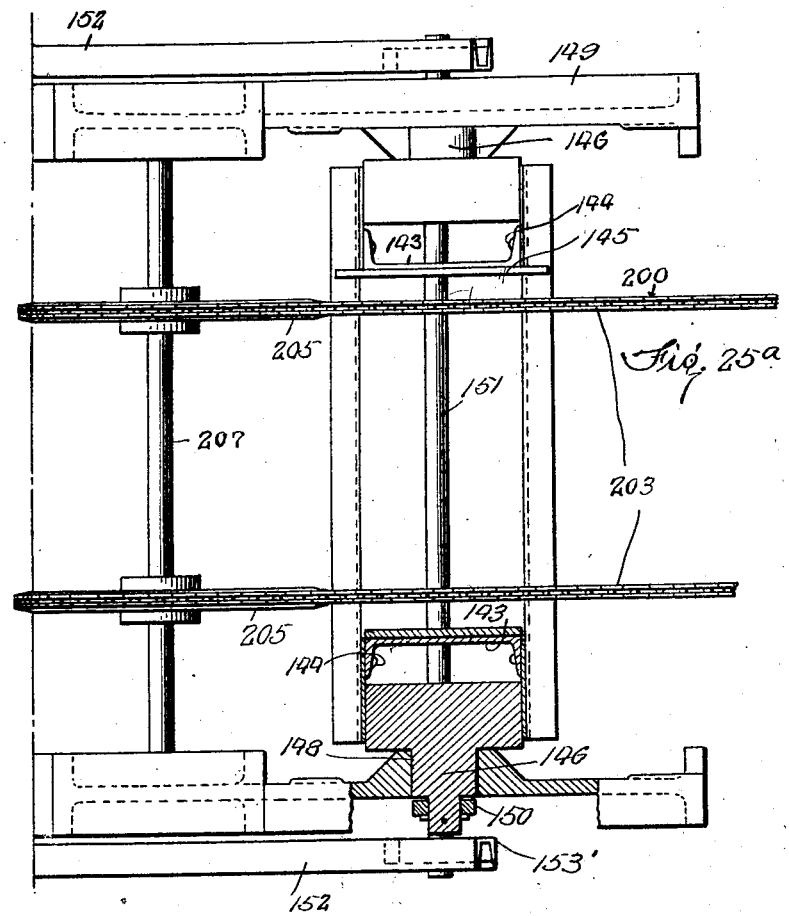
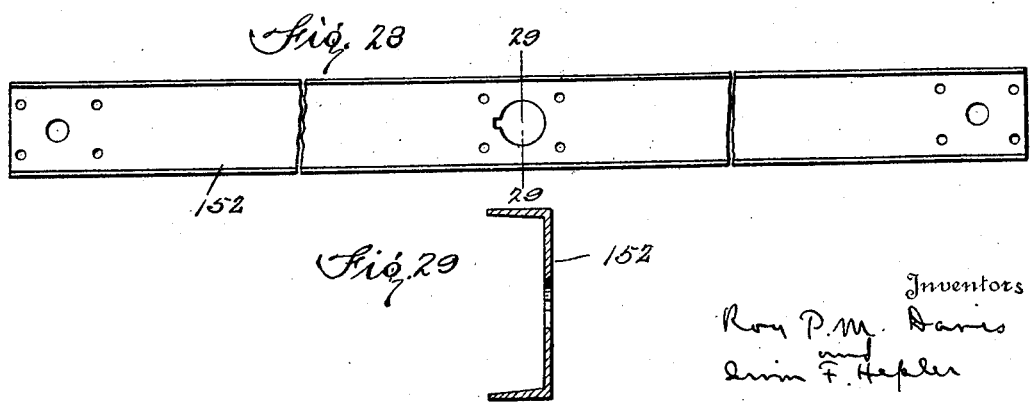
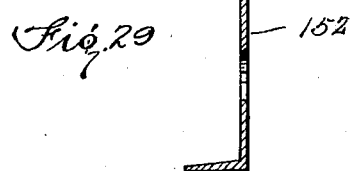

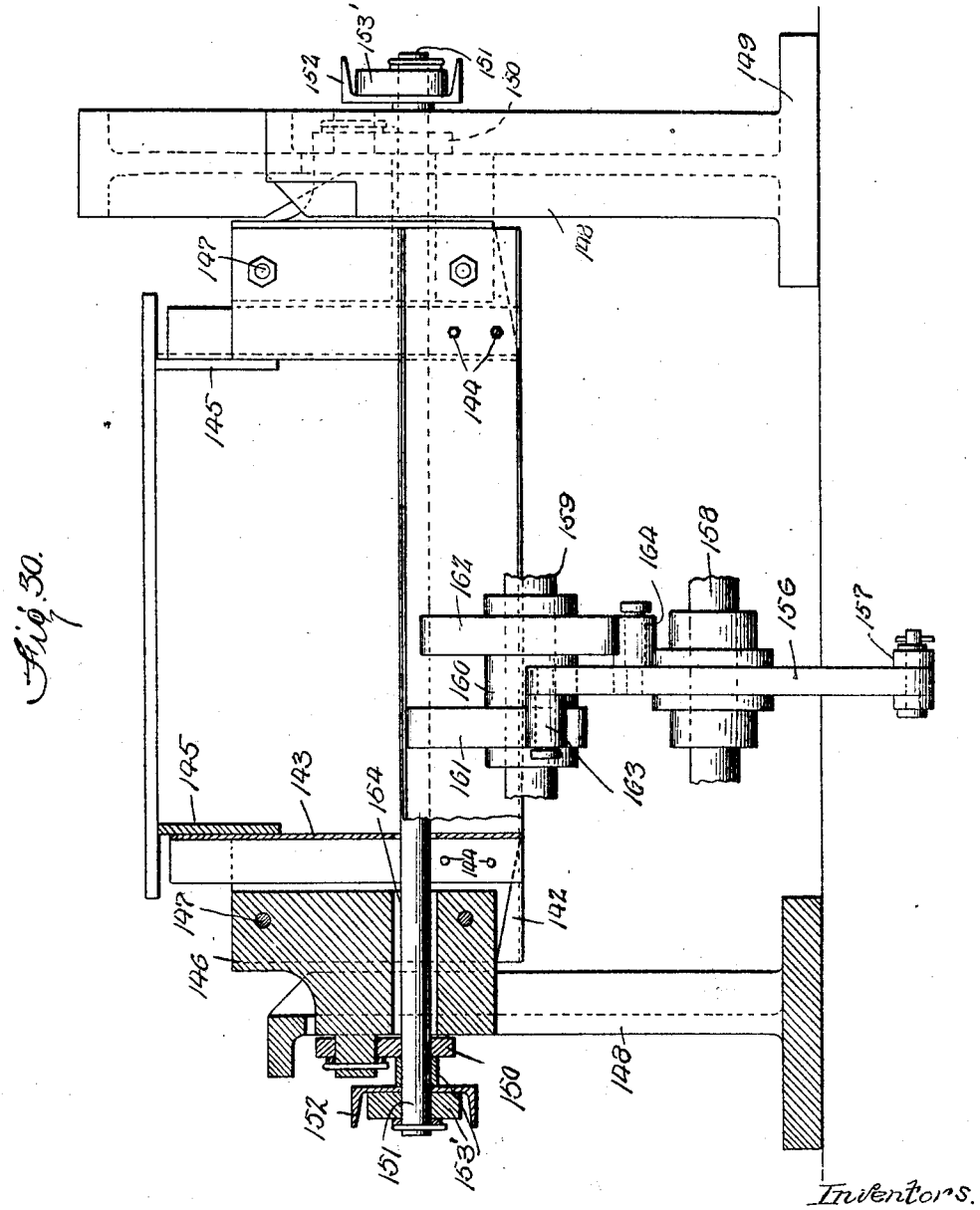

March 17, 1925.
R. P. M. DAVIS ET AL
1,529,692
MACHINE FOR AND METHOD OF MAKING BRICK
Filed Oct. 21, 1922   31 Sheets-Sheet 22
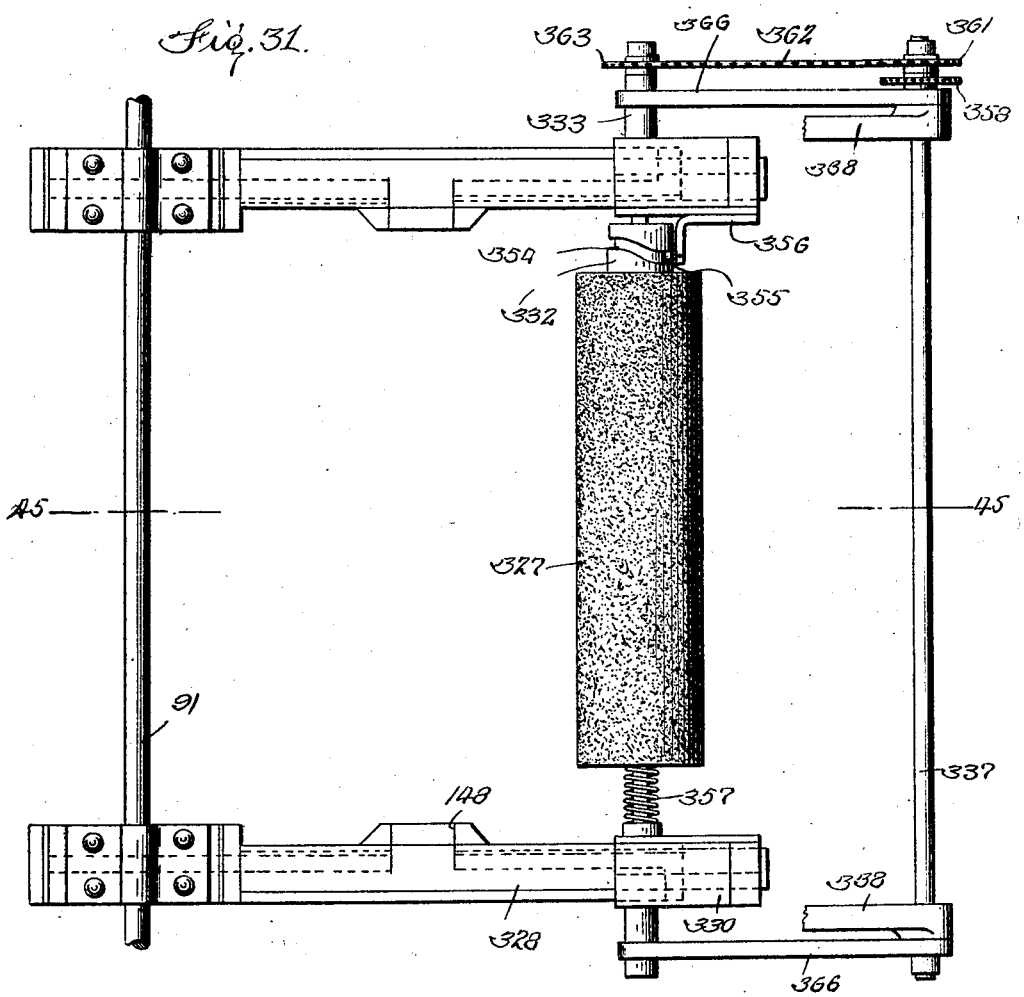
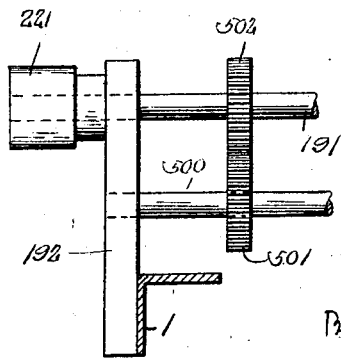

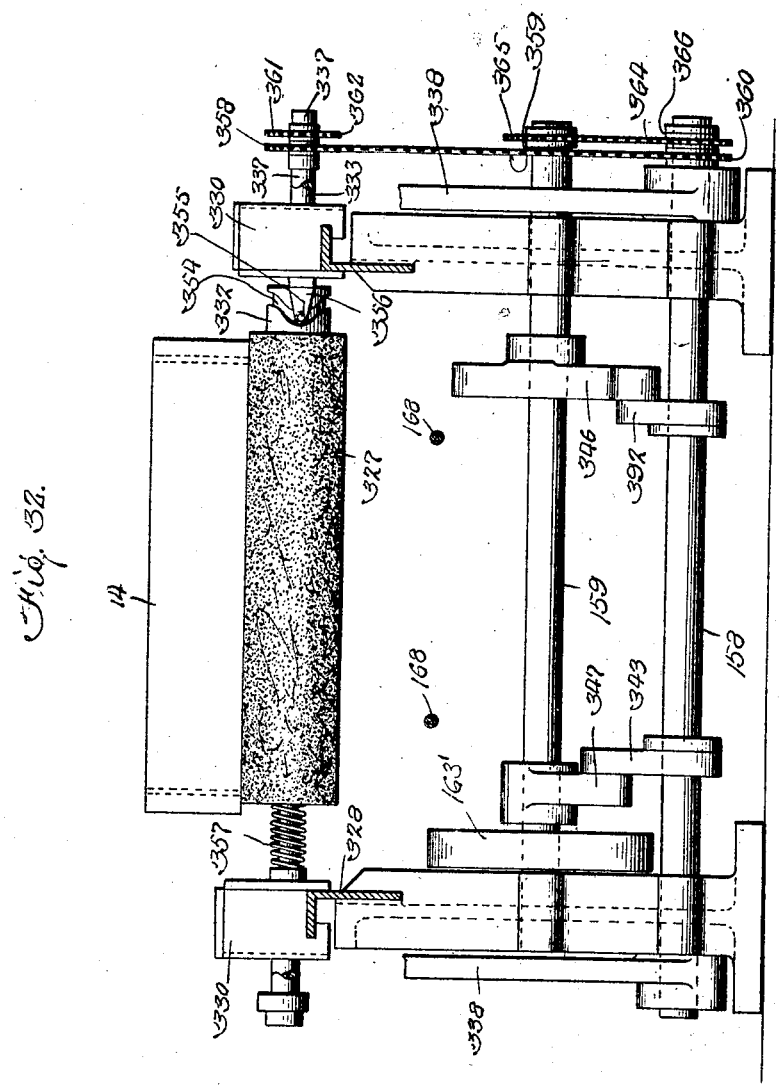

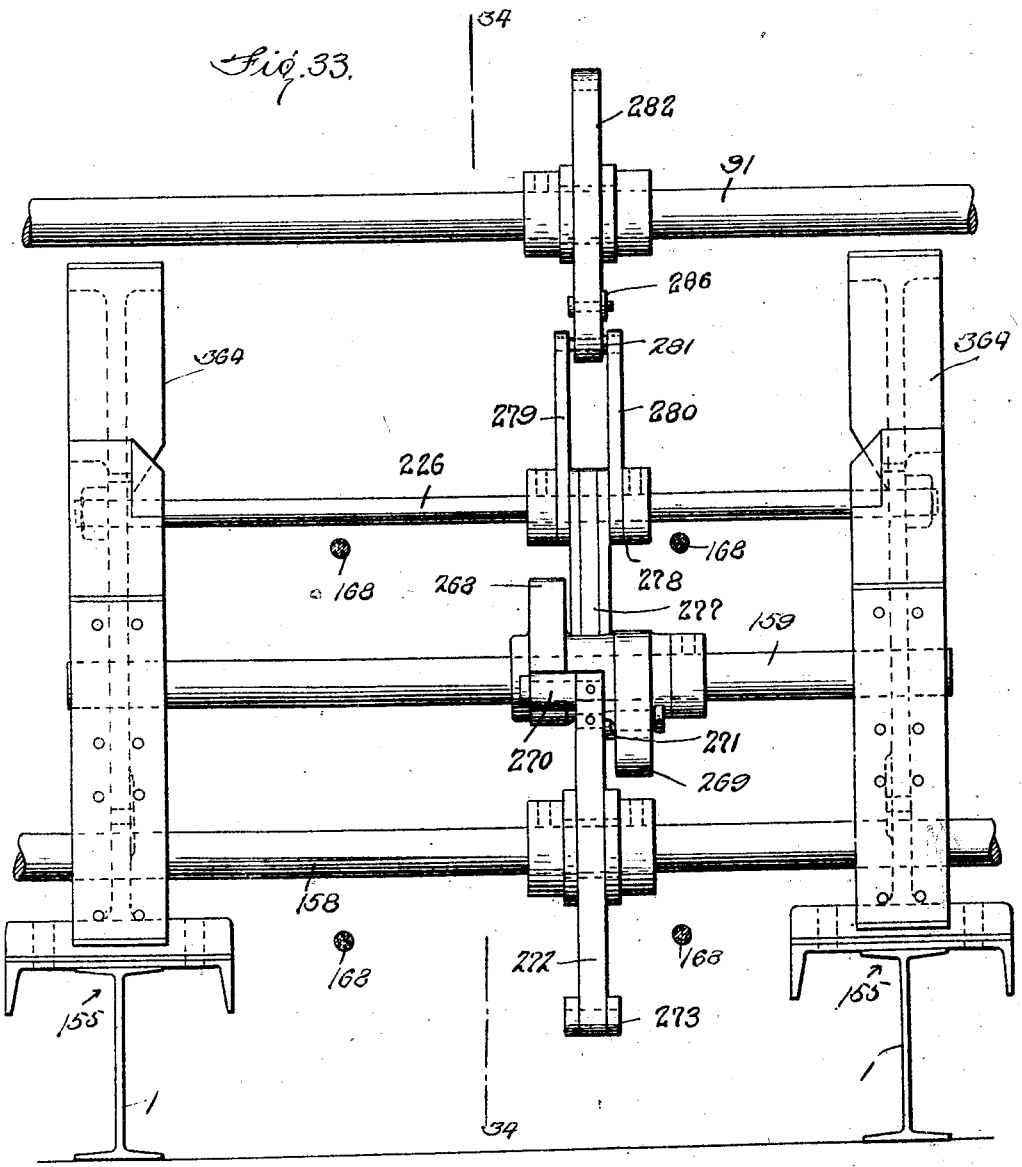

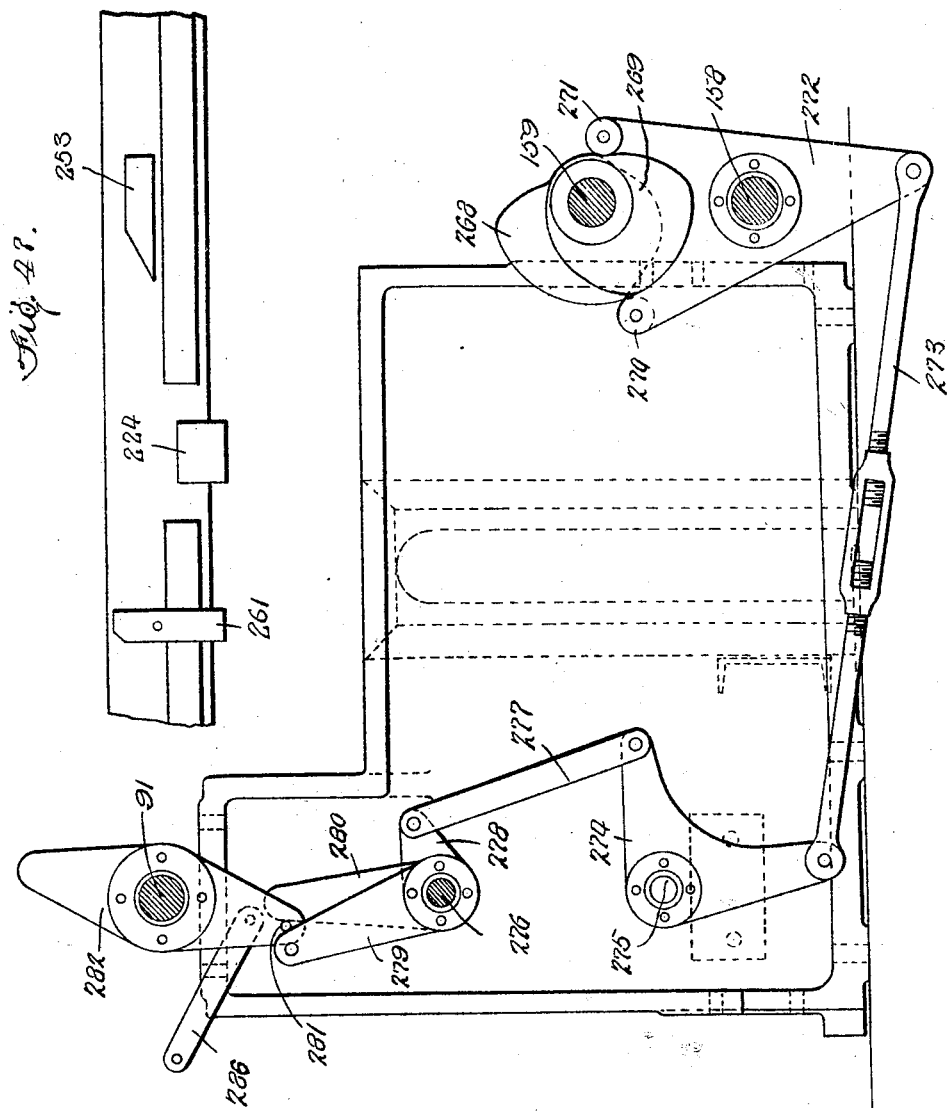

March 17, 1925. 1,529,692
F. P. M. DAVIS ET AL
MACHINE FOR AND METHOD OF MAKING BRICK
Filed Oct. 21, 1922 31 Sheets-Sheet 26
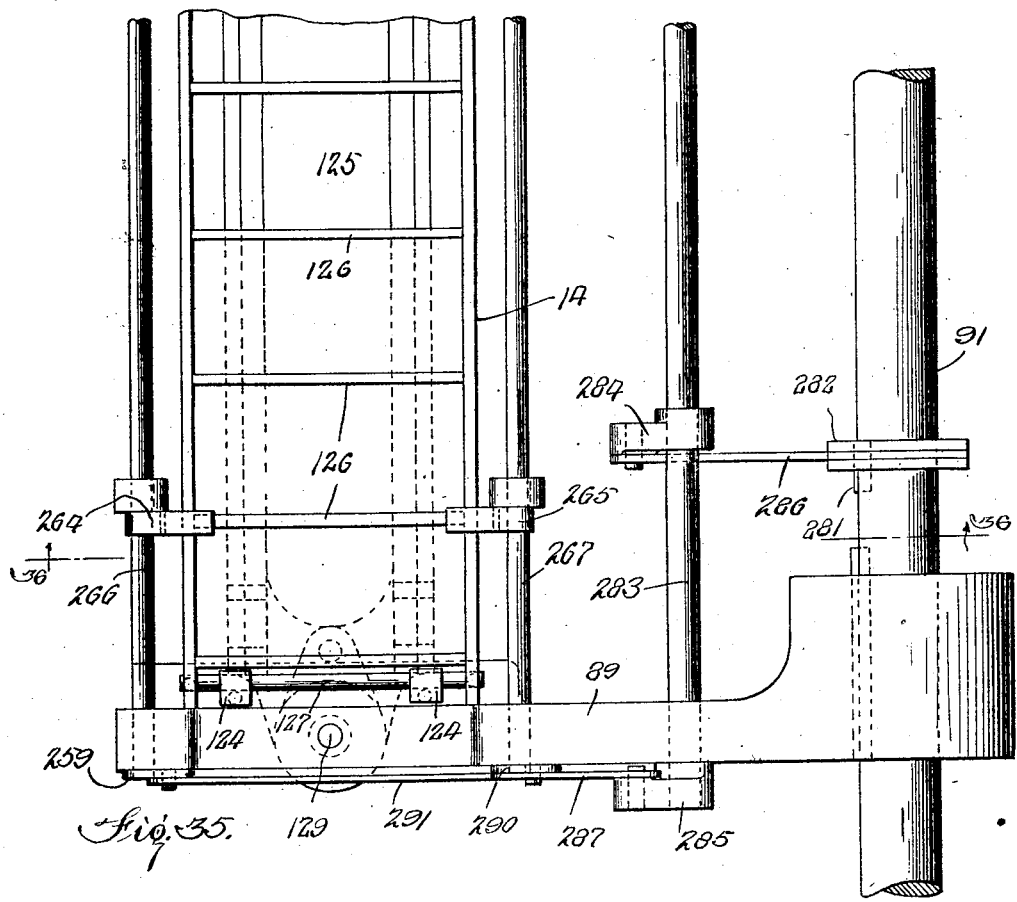
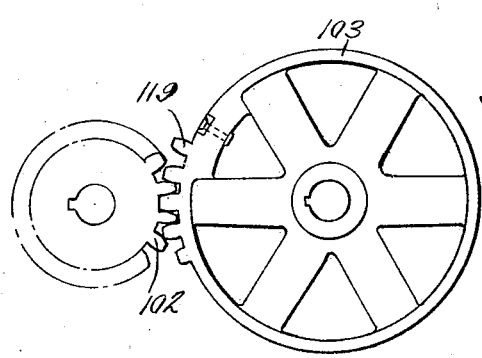
Inventors
Roy P. M. Davis
Irvin F. Hepler
By Percy H. Moore
Attorney.

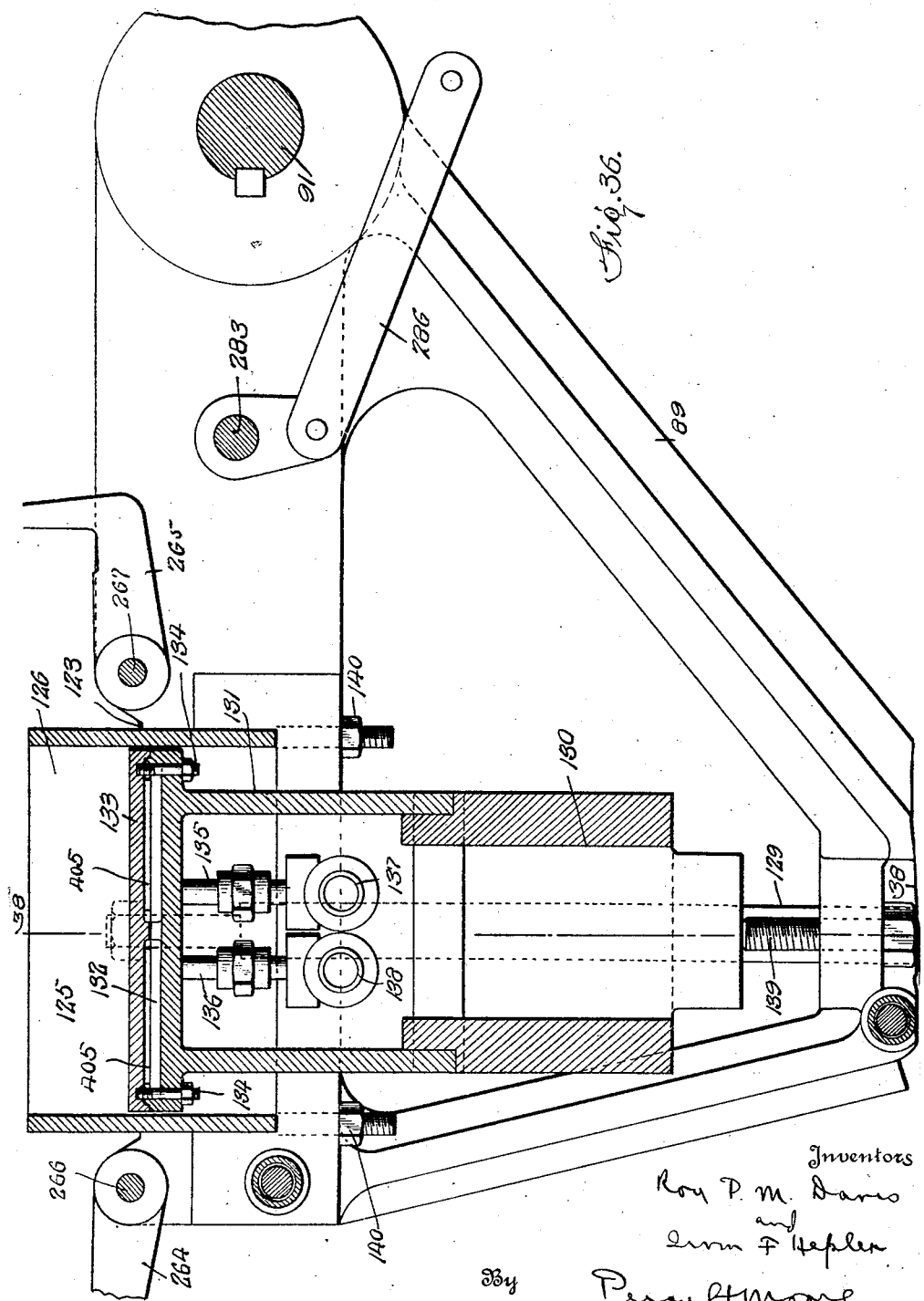

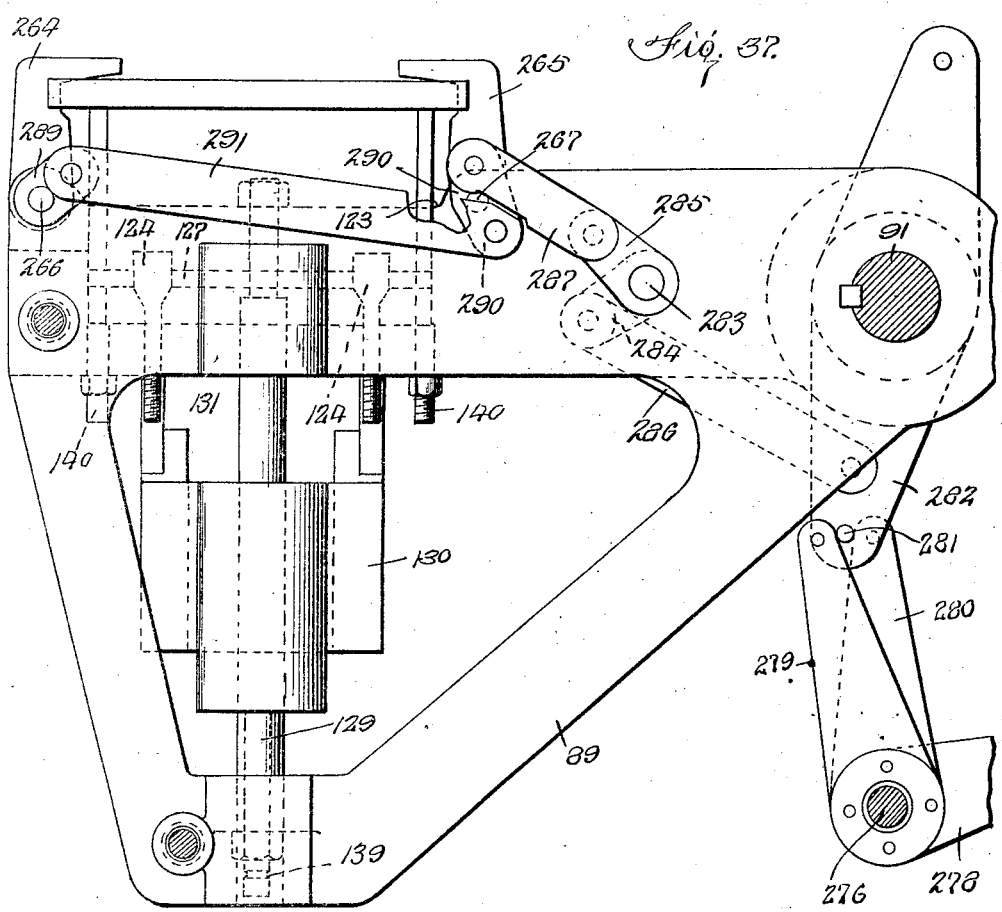
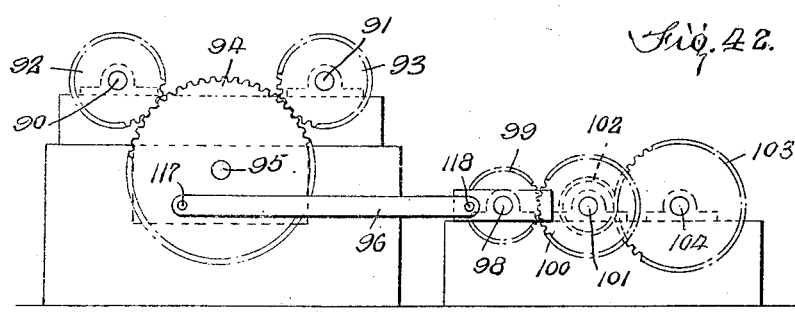

March 17, 1925. 1,529,692
R. P. M. DAVIS ET AL
MACHINE FOR AND METHOD OF MAKING BRICK
Filed Oct. 21, 1922 31 Sheets-Sheet 29
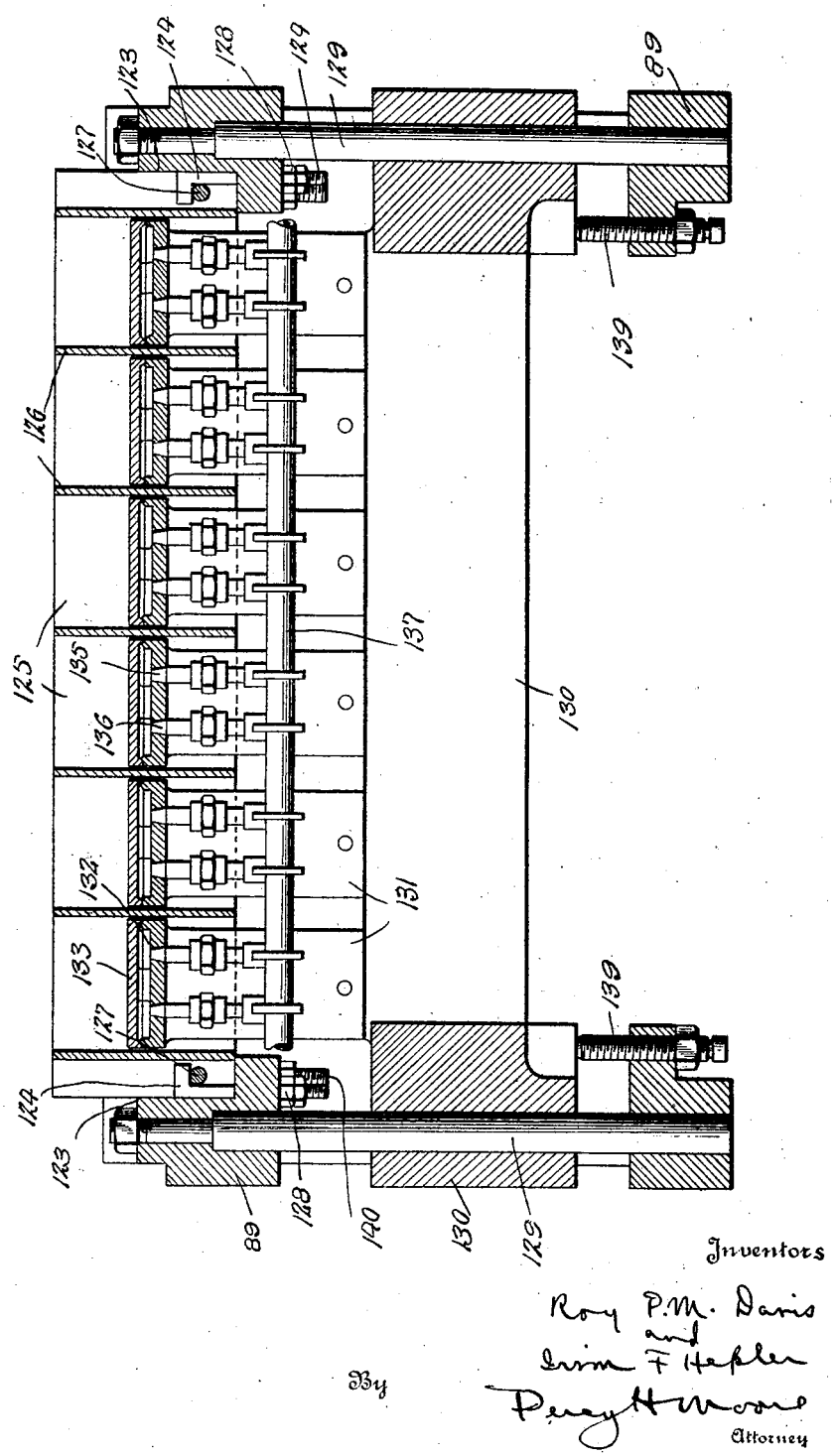

March 17, 1925.
R. P. M. DAVIS ET AL
1,529,692
MACHINE FOR AND METHOD OF MAKING BRICK
Filed Oct. 21, 1922
31 Sheets-Sheet 30
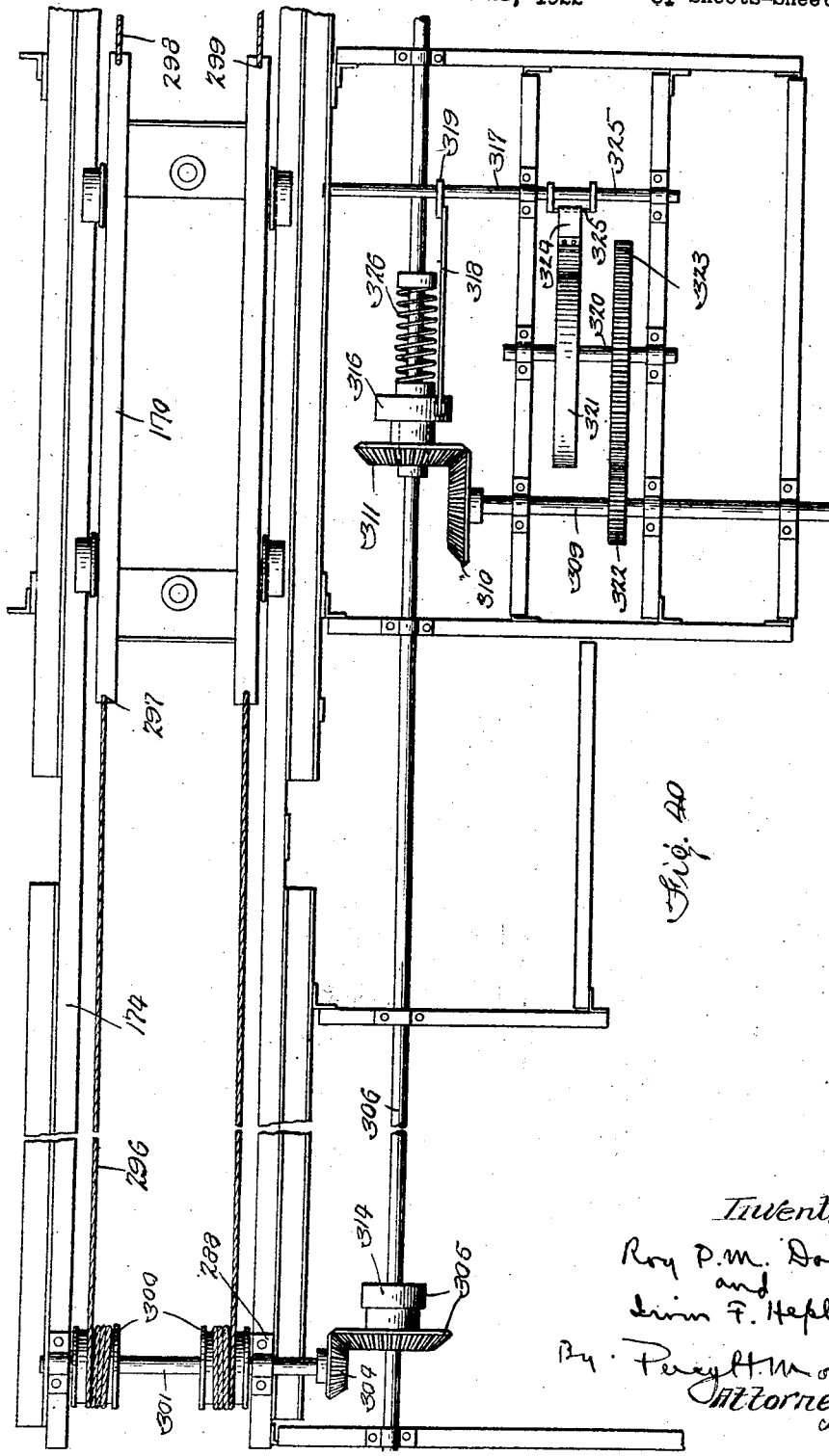

March 17, 1925.
R. P. M. DAVIS ET AL
1,529,692
MACHINE FOR AND METHOD OF MAKING BRICK
Filed Oct. 21, 1922   31 Sheets-Sheet 31
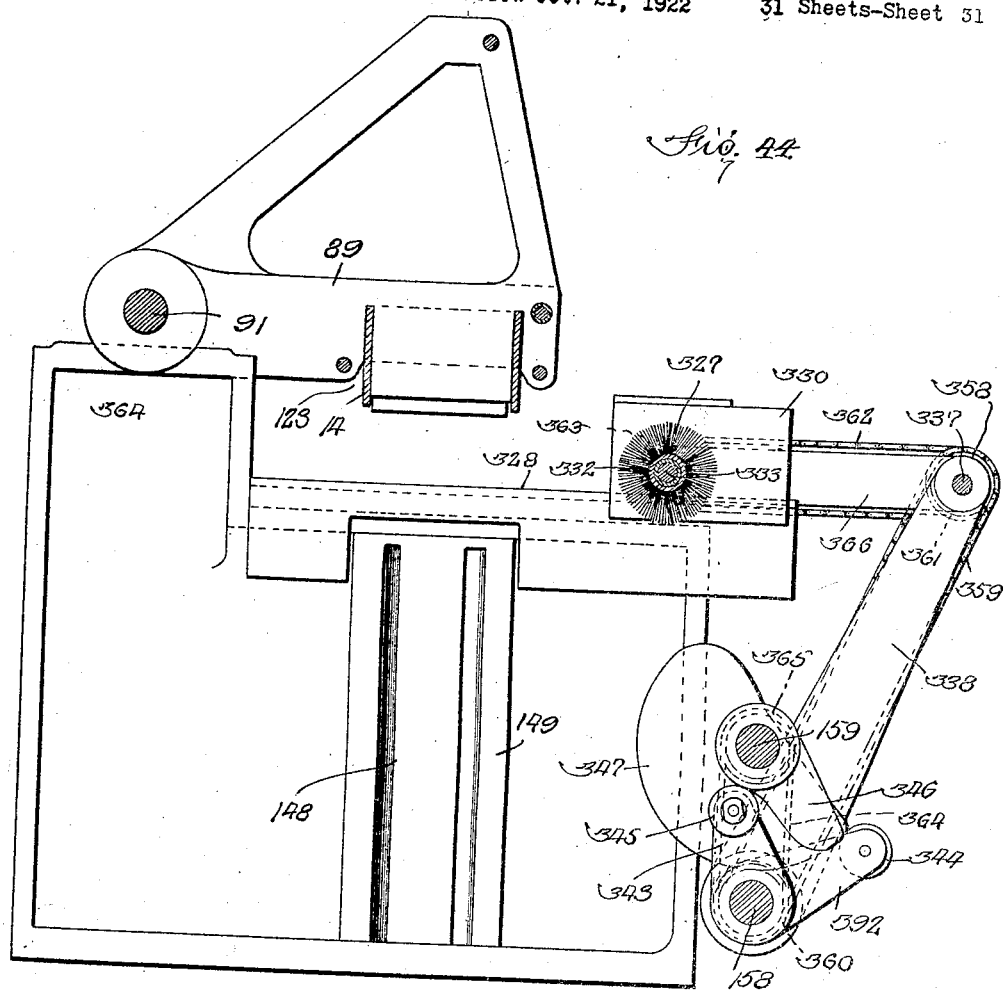
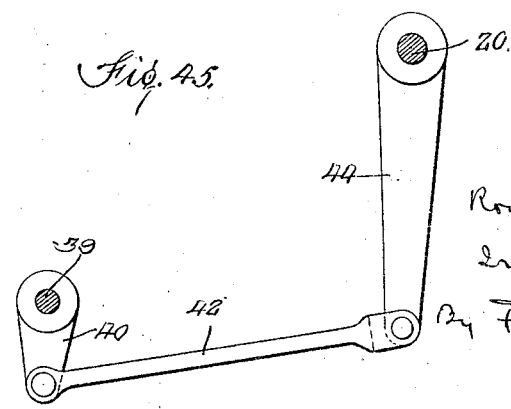

Patented Mar. 17, 1925.

1,529,692

UNITED STATES PATENT OFFICE.

ROY P. M. DAVIS AND IRVIN F. HEPLER, OF MOUNT UNION, PENNSYLVANIA.

MACHINE FOR AND METHOD OF MAKING BRICK.

Application filed October 21, 1922. Serial No. 596,024.

*To all whom it may concern:*

Be it known that ROY P. M. DAVIS and IRVIN F. HEPLER, citizens of the United States of America, residing at Mount Union, in the county of Huntingdon and State of Pennsylvania, have invented certain new and useful Improvements in Machines for and Methods of Making Brick, of which the following is a specification.

Our invention relates to automatic machines for making bricks.

In the making of silica brick it is necessary to the production of a satisfactory article that the mold be properly filled, the rough surface of the mud smoothed down or slicked off, a pallet placed on the top of the mold, the mold turned over, the brick ejected from the mold, and the mold cleaned, and or lubricated and sanded. These operations have heretofore generally been performed by hand.

The object of our invention is to provide a machine which will mold brick having substantially the same desirable characteristics as the hand molded article.

A further object of our invention is to provide a continuously operable automatic machine which will lessen the labor incident to making brick by hand, thereby cutting down expense and greatly increasing the production of the brick making plant.

Other and further objects and advantages of our invention will be in part described and in part obvious as the specification is proceeded with.

In the accompanying drawings forming part of this specification:

Figure 1 is a plan of one unit of the machine with parts omitted to better disclose the invention;

Figure 1ª is a similar view of the other unit;

Figures 2 and 2ª are side elevations of the complete machine showing both units;

Figure 3 is an end view of same;

Figure 4 is a top plan of the hoppers and the means for operating the same;

Figure 5 is a section on line 5—5 of Figure 4;

Figure 6 is a detail plan of one hopper;

Figure 7 is a side elevation of same;

Figure 8 is a detail section on line 8—8 of Figure 5;

Figures 9 and 10 are detail views of hopper gates;

Figure 11 is a side elevation of splash plates and guides;

Figure 12 is an end view of same;

Figure 13 is a detail of one of the splash plates;

Figure 14 is a side elevation of slicker carriage and various parts carried thereon;

Figure 15 is a detail view of the means for operating the slicker shafts;

Figure 16 is a section on line 16—16 of Figure 14;

Figure 17 is a section on line 17—17 of Figure 14;

Figure 18 is an enlarged view of the means for operating the pallet carrying fingers;

Figure 19 is an end view of same;

Figure 20 is a section on line 20—20 of Figure 14;

Figure 21 is a detail section of means for releasing the pallet carrying fingers;

Figure 22 is a plan view of same;

Figure 23 is a section on line 23—23 of Figure 4;

Figures 24 and 24ª are longitudinal sections through the dump table;

Figures 25—25ª are top plans of the dump table;

Figures 26 and 27 are details of the dump table bearing block;

Figure 28 is a detail of one of the channels;

Figure 29 is a section on line 29—29 of Figure 28;

Figure 30 is an end view of dump table;

Figure 31 is a plan view of the brush;

Figure 32 is an end view of the brush;

Figure 33 is an end view of means for operating mold latches;

Figure 34 is a section on line 34—34 of Figure 33;

Figure 35 is a top plan of one end of mold;

Figure 36 is a section on line 36—36 of Figure 35;

Figure 37 is an end view of the mold;

Figure 38 is a section on line 38—38 of Figure 36;

Figure 39 is a plan of slicker carriage frame;

Figures 40—40ª are plans of slicker carriage and means for operating same;

Figure 41 is a detail of mutilated gear;

Figure 42 is a detail of oscillating gearing for molds;

Figure 43 is a detail view of gears for releasing pallet carrying arms in unit 2;

Figure 44 is a section on line 45—45 of Figure 31;

Figure 45 is a detail view of means for locking the hopper gates;

Figure 46 is a detail of means for operating brushes;

Figure 47 is a detail of stops for slicker carriage in unit 2; and

Figures 48 and 49 are detail views of fingers for operating pallet clamps.

Referring more particularly to the drawings wherein like reference numerals indicate corresponding parts throughout the several views, and wherein we have illustrated a preferred embodiment of our invention, 1 denotes an elongated skeleton frame composed of I or U-beams of suitable number and appropriately positioned to support the various parts of the machine. To avoid the use of undue multiplicity of reference numerals and consequent confusion, the various uprights and cross beams of the frame will be uniformly referred to as a part or portion of the frame 1.

Description of elevator.

Supported in the upper portion of the frame 1 by means of angle iron supports 2 and 3 are a pair of hoppers 4 and 5 respectively, as best shown in Figures 2 and 2ª. The mud or material from which the bricks are made, such as silica rock is delivered onto the conveyor 6 at point A by any suitable means (not shown). This conveyor which is continuously driven from any suitable source of power (not shown), and is of the well known pivoted bucket type, passes upwardly over drums 8 and 9 mounted at the top of the frame at opposite ends thereof and thence down under the frame over drums 10 and 11 positioned beneath or on the underside of the frame, and at opposite ends thereof. The pivoted buckets 7 of the elevator 6 have a capacity in excess of the amount required to fill the molds 14 and 15 which a particular bucket supplies. Movement of the conveyor in the direction of the arrow (Figures 2 and 2ª) carries the mud filled buckets 7 up to the upper horizontal level or flight, where alternate buckets are caused by means of cams 12 and 13 on opposite sides of the buckets, to discharge their contents into the hopper 4, the remaining buckets of course discharging into the hopper 5. The conveyor movement is continuous, the mud required for a charge being deposited into the hoppers and the latter discharging into the molds 14 and 15, supported in the frame 1 beneath the hoppers 4 and 5 respectively, for movement into and out of the path of the descending charge of mud, as will be more fully described hereinafter. All of the surplus mud, that is all not used in filling the molds, falls downward onto the buckets of the lower lead of the conveyor, where sufficient fresh mud to fill the buckets is deposited into the latter at point A, from any suitable source of supply (not shown).

Hoppers.

The hoppers 4 and 5 which are identical comprise rectangular housings 16 and 17 respectively, in the upper or mud receiving end of which are fixed, pairs of inclined plates 18 and 19 which absorb the shock of the descending charge of mud, from the conveyor buckets 7. Two pairs of longitudinally disposed horizontal shafts 20 and 21 are supported in the main frame 1 adjacent the lower ends of the pairs of inclined plates 18 and 19, to which shafts are fixed pairs of normally inwardly inclined closed gates 22 and 23, the shafts 20 and 21 and consequently the gates 22 and 23 being connected for simultaneous movement by means of pairs of gears 24 and 25, movement of one shaft of a pair producing a like movement in the other shaft of the pair in a reverse direction. It will be understood that the space between the pairs of gates 22 and 23 is sufficient to support the entire charge of mud from the buckets and that in consequence when the gates are opened the entire charge will be freely discharged into the mold thereneath.

The opening of the respective pairs of gates 22 and 23 is synchronized with the mold movements, hereinafter described so that when the mold 14 is in position directly under the hopper, the gates are rapidly opened, releasing the mud charge which falls into the mold, where a brick similar in shape to that of the mold is formed. This opening of the gates is effected as follows: A vertically disposed shaft 26 having suitable bearings 27 in the frame 1, and seated at its lower end in a base bearing 28 is rotated by the continuously driven horizontally disposed main drive shaft 29 of the machine, by means of a pinion 30 on the drive shaft meshing with a bevel gear 31 on the shaft 26, the main drive shaft being driven from any suitable source of power (not shown) connected up with the gear 110 mounted on the opposite end of the shaft to which the fly wheel 111 is secured. The shaft 26 is provided with a bevel gear 32 at its upper end which meshes with a pinion 33 on a hopper drive shaft 34 mounted in suitable bearings in the frame 1. This shaft 34 has two gears 35 and 36 (one for each unit) which mesh with corresponding gears 37 and 38 on sleeves 55 and 56 loosely mounted on the shaft 39 also journaled in the frame 1. Mounted on the opposite ends of the shaft 39 by means of connecting links 40 and 41 are pivoted links 42 and 43 respectively. These links 42 and 43 are pivoted at their other ends to one end of crank arms 44 and 45 in turn fixed at their opposite ends respectively to one each of the pairs of hopper shafts 20—20 and 21—21. The shaft 39 also carries a pair of clutches 53 and 54 adapted to operatively connect the sleeves 55 and 56 to shaft 39 in a manner presently to be described.

A timing shaft 46 suitably mounted in the frame 1 at one side of the shaft 34 and in the same horizontal plane therewith, carries a large timing gear 47 which meshes with a small gear 48 on the shaft 34. The timing shaft 46 also has fixed thereto a pair of timing discs 49 and 50 (one for each unit) which discs carry on their respective peripheries adjustable fingers 51 and 52 adapted to engage and actuate the clutches 53 and 54 at each revolution of the discs thereby causing the shaft 39 to make one complete revolution. The clutches are automatic in operation and release the sleeves 55 and 56 permitting the latter to run idle after one complete revolution of the shaft 39, and until the fingers 51 and 52 on the discs again engage the clutches. One complete rotation of the shaft 39 and sleeves 55 and 56 causes the hopper gates to open to discharge the charge of mud thereon to the molds, and then move to closed position ready to receive another load from the conveyor buckets.

When the hoppers are closed the links 42 and 43 lie in substantially horizontal position, and just past dead center, thereby locking the hopper gates against opening movement under the force of the impact of the next descending charge of mud.

The inclined gates having been opened as described at the proper time, the mass of mud, being deprived of any means of support, falls freely into the mold, the gates are then closed as the pivot shafts complete a revolution and remain closed in located position ready to receive the next charge from the elevator or other source of mud supply. This operation is repeated as long as the machine is in operation, being entirely automatic. The finger on the circumference of the disc 49 can be set at various positions on the circumference, thus enabling close regulation of the time when the gates operate.

Splash plates.

In order to prevent the charge of mud (which descends to the mold with great force) from splashing over the machine, pairs of inclined splash plates 60 and 61 respectively are provided for each mold. These plates slidably rest upon angle guides 62 and 63 respectively, supported at their upper ends in the frame 1 and at their lower ends being supported by supporting brackets 363 and 364. As it is necessary to elevate these splash plates at predetermined intervals to permit of the mold supports being swung on their pivots, elevating means for raising the plates is provided as follows: Large drums 65 and 66 (one drum for each unit) are mounted on shafts 67 and 68 in turn supported in the frame 1, above the splash plate guides 62 and 63. These shafts 67 and 68 also carry small drums 69 and 70 (one for each unit). A second pair of small direction pulleys 71 and 72 (one for each unit) are suitably mounted in the frame 1 adjacent the respective drums 65 and 66. One end of cables 73 and 74 (one for each unit) are connected respectively to the upper end of one each of the pairs of splash plates 60 and 61, the other end of the cables being fixed to the large drums 65 and 66 as at 77 and 78. Likewise one end of the cables 75 and 76 (one cable for each unit) are connected respectively to the upper ends of the remaining splash plates 60 and 61, the opposite ends of the cables being connected to the large drums 65 and 66 as at 79 and 80. A third pair of cables 81 and 82 (one cable for each unit) pass between guide rollers 83 and are connected to the free end of the arms 84 and 85, in turn fixed at their opposite ends to shafts 86 and 87 mounted in the frame 1.

Mold support operating mechanism.

As previously described the pairs of mold supports 88 and 89 (one pair for each unit) (only one pair being shown and described) are fixedly mounted upon two parallel shafts 90 and 91 in turn supported on the supporting brackets 363 and 364. Fixed on corresponding ends of these shafts respectively are gears 92 and 93 which mesh with opposite sides of a large gear 94 fixed on a shaft 95 in turn mounted in suitable bearings in the frame 1. Connected to the gear 94 by means of crank pin 117 is a pitman 96 which in turn is connected to a crank arm 97 by means of crank pin 118; the crank arm 97 being fixed to a short stub shaft 98 mounted in the frame 1. The stub shaft 98 carries a gear 99 which meshes with a gear 100 on a second short stub shaft 101 also mounted in the frame 1. This second stub shaft has a second small gear 102 fixed thereto which meshes with a large gear 103 on one end of the shaft 104; the other end of the shaft 104 has a large gear 105 fixed thereto and in mesh with a small gear 106 on the short stub shaft 107 in turn mounted in frame 1. This stub shaft 107 also has a large gear 108 in mesh with the small gear 109 on the main drive shaft 29 of the machine.

The main drive shaft 29 of the machine being continuously driven through the gear 116 from a source of power (not shown) in a clockwise direction, will cause the stub shaft 107 through the medium of the gears 108 and 109 to rotate in an anti-clockwise direction which in turn will communicate clockwise movement to the shaft 104 through gears 105 and 106. The stub shaft 101, will thus be rotated in an anti-clockwise direction by gear 102 meshing with mutilated gear 103, these gears being fixed to the respective shafts 101 and 104. Stub shaft 98 is actuated in a clockwise direction by gears 99 and 100 fixed to the respective shafts 98 and 101, and as the pitman 96 is connected at one end to the crank arm 97 fixed to the shaft 98, and at the other end is connected to the gear 94 on shaft 95 by means of pivot pin 117, it follows that rotation of the shaft 98 in a clockwise direction will cause the gear 94 to rotate in an opposite or anti-clockwise direction. The gear 94 on shaft 95 being in mesh with both gears 92 and 93 on the respective mold support shafts 90 and 91, the mold support shaft 91 will be caused to rotate in a clockwise direction causing the mold support 89 to oscillate in a clockwise direction to Figure 24ᵃ position, or dumping position, while the mold support shaft 90 will be rotated in an anti-clockwise direction, carrying the mold support 88 together with the mold carried thereby, to Figure 24 or filling position.

It will of course be understood that this movement of the mold supports must be intermittent, or oscillating, so that the filling and dumping operations will be continuous, and to this end—by means of proper gear reduction—the shaft 98 is caused to make one half a revolution and the gear 94 a quarter of a revolution for every complete revolution of the shaft 104. The gear 94 has 64 teeth and the gears 92 and 93 have 32 teeth and consequently the gear ratio being as two to one, the gears 92 and 93 will make a half revolution. Furthermore, the gear 103 being mutilated will reverse the direction of movement of the gears and mold supports actuated thereby at the end of each complete revolution of the shaft 104 by causing a half revolution of the shaft 98 in a reverse or anti-clockwise direction as follows: The teeth 119 of the mutilated gear remain in mesh with the gear 102 sufficiently long to cause the shaft 98 to make one half a revolution in a clockwise direction, and the mold supports 88 and 89 to oscillate respectively to Figures 24 and 24ᵃ positions, at which time the crank pins 117 and 118 will have been brought to a stop at dead center position or on a horizontal line passing through the center of shaft 98. The mold supports remain at rest during the remainder of the time consumed while the shaft 104 is completing its rotation, and until the teeth of gear 103 again engage the teeth of gear 102, whereupon the mold supports will be oscillated in a reverse direction to that previously described. This cycle is continuous and of course takes place in both units.

Each oscillatory movement of the mold support shaft results in a corresponding movement of the short shaft 86 upon which the crank arm 84 is mounted. This is accomplished by means of a sprocket chain 120 passing over sprockets 121 and 122 mounted on the shafts 86 and 90 respectively. When the mold support shaft 90 is being rotated in a clockwise direction to bring the mold support into upright or filled position the crank arm 84 is swung in a clockwise direction, and through the cable 81 imparts a clockwise movement to the large drum 65. This movement of the drum 65 causes the cables 73 and 75 to wind upon the former, thereby elevating the splash plates along the inclined guide 62, sufficiently to provide clearance for the mold supports. The splash plates drop of their own weight to original or lowermost position as each mold support in its turn seats itself on the rotary support or anvil 400 presently to be described, in which position the splash plates prevent the falling charge of mud from splashing except within the confines of the said plates. These splash plates also direct the excess material to the lower lead of the bucket conveyors.

*Anvils.*

The anvil 400 comprises rotary discs 401 loosely mounted in opposite ends of a shaft 153, in position to be engaged by the angled ends of the mold supports when the latter are swung into mold filling position. These anvils absorb the shock of the descending charge of mud, and thereby relieve the mold supports and mold support actuating mechanism from undue shock or strain. These discs 401 are revolved slightly as the mold supports come into contact therewith, which movement tends to prevent undue wear of the discs or mold supports at their points of contact. Furthermore, such slight rotary movement prevents the accumulation of particles of mud which may temporarily adhere to the discs.

*Mold supports and molds.*

The mold supports comprise pairs of spaced angularly shaped members 88 and 89 preferably castings, keyed to shafts 90 and 91, and adapted to be oscillated at predetermined intervals about the axis of said shafts, as will appear more fully hereinafter. There are two pairs of these supports for each unit, one pair of each set being identical with the other pair of the set with the exception that one pair is right hand and the other pair of that set left hand. These supports are provided with recesses or sprockets 123 in their upper normally horizontally disposed edges in which the ends of the molds are seated (see Figures 24, 24ª and 37) it being understood that each mold spans a pair of supports and is supported at its ends thereby.

The molds which are of rectangular shape and open at top and bottom are subdivided into a plurality of compartments 125, by means of partitions 126. Hook bolts 124, two at each end of each mold pass through the supports, and engage over rods 127 extending between and supported by opposite sides of the mold, thereby securely clamping the mold to its support. Nuts 128 on the hook bolts lock the latter in place.

Slidably mounted on vertically disposed rods or bolts 129 mounted in the mold supports are plunger blocks 130, one for each mold formed with a plurality of plungers 131, normally projecting partially through the mold compartments 125. These plungers are recessed in their heads to form steam chambers 132, brick heating pads or plates 133 which are secured to the heads of the plungers as by bolts 134 form the top wall of steam chambers 132 and the bottom of the mold compartments. It is necessary to heat the pads or plates 133 in order to prevent silica mud from adhering thereto, as will be appreciated.

Each steam chamber communicates with a short steam inlet or feed pipe 135 and a short steam outlet pipe 136 which in turn communicate with the steam inlet header 137 and the exhaust steam header 138 respectively. Control of the passage of the steam through the headers is had, by means of valves (not shown) suitably positioned in the headers. Consequently the pads 133 and through them the brick can be heated to any desired temperature. If desired the pads or plates 133 may be electrically heated by locating a suitable resistance element 405 beneath the pads to which element current is supplied from any source of current (not shown).

As previously stated the pads 133 form the bottom of the mold compartment and in consequence receive the charge of mud as the latter descend from the hoppers. Adjustment of the plungers 131 and heating pads or plates 133 carried thereby, upwardly or downwardly in the compartments 125 regulates the depth or thickness of the brick. This adjustment is made by means of bolts 139 passing through the mold support casting and engaging beneath the plunger block 130.

The upper edges of the molds including the partitions 126 are subject to great wear which is compensated for as follows: As wear takes place, the mold is removed, resurfaced and then replaced. This resurfacing reduces the depth of the mold, bringing the top edges of the latter closer to the heating pads or plates. This is then offset by screwing home bolts 140, threadedly mounted in the upper portion of the mold supports and arranged to engage with their upper ends the four lower corner edges of upper ends the four lower corner edges of the mold. The hookbolts 124 are then drawn down and locked. If desirable, after the upper edges of one face of the mold becomes worn the mold can be taken out and reversed thus presenting an unworn edge above the mold support recess. To this end the molds are made of sufficient height to normally project a considerable distance above the edge of the mold support recess.

The ejection of the bricks from the mold compartments automatically takes place as the mold supports are oscillated to dumping position. This is caused by the plunger block dropping by gravity towards the mold, it being noted that the plunger block is free to slide on the rods 129. This movement of the block precipitates the plungers 130, through the mold compartments, thereby ejecting the brick therefrom, onto the dump table, hereinafter referred to.

*Dump table.*

Each unit is provided with a pair of what may be termed dump tables 141 and 141' one for each mold. These tables which are rectangular shape and open at top and bottom comprise side channels 142 and end channels 143 suitably connected together by bolts 144. Positioned within and projecting above the upper open end of the tables and secured to the end channels 143 are a pair of pallet supporting plates 145. The side of pallet supporting plates 145. The side channels 142 project beyond the end channels to receive therebetween bearing blocks 146, bolts 147 securing the blocks in place. These bearing blocks slidably engage within the guide slots 148 formed in the auxiliary base frame 149. The outer reduced end portions of the bearing blocks swingingly support depending links 150 which in turn support the ends of shaft 151. These shafts extend through the tables and through suitable rock beams such as channel bars 152 at each side of the tables, bearing blocks 153' on opposite sides of the channels being employed for an obvious purpose.

The tables for each mold two in number are alternately raised and lowered by means of the channel bars 152, when, the latter are rocked by the shaft 153, to the opposite ends of which the channel bars are fixed intermediate their ends, the openings 154 in the bearing blocks 146 through which the shafts 151 extend being sufficiently large to permit of the necessary play incident to this movement.

The shafts 153, there being one for each unit, having fixed thereto at one end a depending crank arm 155 connected to a bifurcated finger 156 through the medium of the connecting rod 157 (see Figures 3, 24 and 24ᵃ). This finger is pivotally mounted on the finger shaft 158 which in turn is mounted at its ends in the auxiliary base frame 149.

Mounted in the base frame 149 directly above the finger shaft 158 is a cam shaft 159 to which is fixed a sleeve 160 carrying two spaced cams 161 and 162 of similar shape and size but being differently positioned on the sleeve. The cam shaft 159 has a gear 163′ fixed thereto which meshes with a gear 164′ mounted on a short shaft 165 in the frame 1 (see Figure 1). This shaft 165 is driven from shaft 104 previously referred to, by means of a small gear 166 on shaft 104 in mesh with a large gear 167 on said shaft 165, shaft 104 as previously stated being driven from the main drive shaft 29 through gears 105, 106, 108 and 109. As the mold supports 88 and 89 are being swung to the relative positions illustrated in Figures 24 and 24ᵃ the cam shafts 159 are being continuously rotated in a clockwise direction, and the cams 161 and 162 thereon which are also continuously rotated in a clockwise direction engage respectively the rollers 163, and 164, on the bifurcations of finger 156, thereby causing the dump tables on opposite ends of the channel bars 152 to alternately rise and fall. The cam 161 first engages the roller 163 thus actuating the finger 156 in an anti-clockwise direction, and finger 156 being pivotally connected at its lower end to the rod 157, in turn connected to the crank arm 155 on anvil shaft 153, the shaft 153 will be rotated in an anti-clockwise direction, thereby in turn causing the dump table 141′ to be elevated into Figure 24ᵃ position. The cam 161 then rides clear of the roller 163, as the cam 162 comes into engagement with the roller 164. Further movement of the cam 162 causes the finger 156 to be moved in a reverse or clockwise direction, thus rocking the shaft 153 in clockwise direction, whereupon the mold table 141′ will be lowered to deposit its pallet and brick upon a conveyor to be presently described, while at the same time the dump table 141 is being elevated into position to receive the pallet and brick carried by the mold support 88.

Conveyors.

Positioned between opposite sides of the auxiliary base frame 149 are pairs of two strand endless rope brick conveyors 375 and 375′, one pair for each unit. The conveyor 375 comprises endless ropes 166 passing over pulleys 167′, the upper flight of the ropes being continuously driven towards the left Figure 3, by any suitable source of power (not shown). The conveyor 375′ comprises endless ropes 168 passing over pulleys 169, the upper flight of the ropes being continuously driven toward the right Figure 3, also by any suitable source of power (not shown). As the dump tables descend, the pallets and bricks deposited thereon by the mold supports, engage the conveyor ropes and are lifted off the dump tables, or rather are deposited upon the conveyor ropes as the tables continue their descent between the ropes, and are thence carried outward from the center of the machine to a point (not shown) where the finished brick are placed on cars to be transeferred to the dryers.

Slicker carriage.

After the charge of mud has been deposited in the molds, the excess material is scraped or brushed off, the brick slicked, and then a pallet placed on top of the mold over the brick and clamped in place. These steps or operations are automatically accomplished as follows:

The numeral 170 denotes generally a carriage for carrying the rotary slickers, the slicker elevating and lowering mechanism and the pallet pick up and depositing mechanism. This carriage which is of skeleton angle iron construction comprises side plates 171 and end plates 172 suitably connected together. Wheels 173 mounted on stub shafts 174 carried by the side plates, support the carriage for movement to and fro over the tracks 175, forming part of the main frame 1 of the machine. Plates 176 depending from opposite ends of the side plates 171, support at their end, side angle bars 177, braces 178 serving to strengthen these parts. A pair of transverse angle bars 179 suitably connected to the bottom sides of the side angle bars 177, support a pair of longitudinally disposed shafts 180, from opposite ends of each of which shafts depend a pair of pallet fingers 181 notched at their ends as at 182 to receive and facilitate the gripping of the side edges of the pallet 183 therebetween. Springs 184 normally tend to draw opposing pallet fingers toward each other.

The shafts 180 are connected together at one end for simultaneous movement by means of crank arms 185 and 186 in turn connected by the connecting rod 187. A third crank arm 188 connected to that shaft 180 to which the crank arm 186 is fixed, is connected by means of a cable 189 to a rock arm 190, mounted on a shaft 191, journaled in brackets 192 supported by one of the braces 178 of the carriage 170. Also fixedly mounted on the shaft 191 is a locking disc or ratchet 193 the periphery of which is formed with a shoulder 194. A pawl 195 mounted on a short stub shaft 196, secured to the bracket 192, is adapted to engage over the shoulder 194 of the disc 193, to lock the rock arm 190 in elevated position. When in this position the shafts 180 have been oscillated through the cable connection 189, and the pallet fingers opened against the tension of springs 184, in position to grasp a pallet. The pawl is lifted out of locked position by means of a rock arm 197 also pivoted to the brackets 192 as at 198, and connected to the pawl 195 by a link 199. As the pawl is lifted clear of the shoulder 194 the rock arm is pulled down as the pallet fingers close upon a pallet, under the action of the springs 184 as will be presently described more in detail.

The pallets are brought into position to be grasped by the pallet fingers by a pair of oppositely travelling conveyors 200 and 201, one pair for each unit, and each conveyor comprising chains 203, and 204 respectively, running over sprockets 205 and 206 on the respective shafts 207 and 208. The shaft 208 is continuously driven from the main drive shaft 29, by virtue of the sprocket and chain connection 209 on shafts 208 and 104, while the shaft 207 is driven from the same source as follows: The shaft 207 is connected to shaft 209' by sprocket wheel and chain connection 210, the shaft 209' being connected to a shaft 211 through a gear 212 on a shaft 213 and meshing with gears 214 and 215 on the respective shafts 209' and 211. The shaft 213 also carries a beveled gear 214' (see Figure 1ª) in mesh with a bevel gear 215' on one end of a shaft 216, the other end of which shaft 216 has a bevel gear 217 in mesh with a bevel gear 218 mounted on the shaft 104.

The pallets which are placed upon the conveyors 200 and 201 by any suitable means not shown are picked up by the pallet fingers at predetermined intervals during the the movement of the carriage to and fro upon the tracks 175.

Assuming the pallet fingers 181 to be in open position, and of course the pawl 195 engaging the shoulder 194 of the disc 193 (all Figure 14 position), and assuming the carriage 170 to be moving toward the right in Figure 14, or in a direction to bring the roller 219 on the free end of rock arm 197, into engagement with the cam 220 on the frame 1, engagement of the roller with the cam depresses the free end of said rocker arm and causes the pawl 195 to be lifted clear of the shoulder 194. The springs 184 will then be free to close the fingers upon a passing pallet carried by the pallet conveyor, the path of which is crossed by the carriage in its to and from movement. This action takes place directly over an empty pallet placed so that the tapered notches 182, on the ends of the pallet arm 181, will engage the pallet, hold it, and carry it along as the slicker carriage moves over the mold. The slicker hereinafter referred to, on the carriage passes over the mold, the excess mud being smoothed away or "slicked" thereby. Continued movement of the carriage in the same direction brings the dog 221 fixed to the shaft 191 into contact with the stop 222 on the frame 1. This causes the disc 193 to be actuated in a clockwise direction until the shoulder 194 rides over and engages behind the pawl 195, and thus elevating the rock arm 190, and through the cable connection 189 rocking the pallet fingers outwardly or away from each other to release the pallet. The latter at this time will have been moved directly over the mold which has previously received its charge of mud, and which charge of mud in the mold has been slicked by the rotary slicker just referred to, and which will presently be described in detail. The carriage is then reversed and the pallet fingers remain open until the roller 219 again contacts with the cam 220, whereupon another pallet will be picked up and carried to the right (Figure 21) until the dog 223 on shaft 500 carried by the brackets 192 engages the stop 224, which stop is in the second unit.

As the dog 223 engages the stop 500 and gear former together with the shaft 500 and gear 501 thereon will be rotated in an anticlockwise direction. This causes the gear 502 fixed to shaft 191 and in mesh with gear 501 to rotate in an a clockwise direction, thereby elevating the rock arm 190 and releasing the pallet on the mold in the other unit. It will be understood that this cycle of operation is continuous.

*Slickers.*

The slickers comprising flat discs, two in number, designated 225 and 226, are fixed to the ends of the respective shafts 227 and 228, slidably and rotatably journaled in bearings 229 and 230, in turn mounted in the carriage 170. These shafts are continuously rotated at a high rate of speed through bevel gears 231 and 232, on the respective shafts meshing with bevel gears 233 and 234, fixed to the opposite ends of a shaft 235 journaled in supports 236, on the carriage 170. A small motor 237 drives the shaft 235 through gears 238 and 239 on the motor and shaft respectively, it being of course understood that during the slicking operation the slickers (discs 225 and 226) are moved downwardly into position to just clear the top of the mold, and to brush away the excess material from the mold. As the rapidly rotating slickers are moved across the mold by the movement of the slicker carriage 170, the brushing rotating smoothing of the slickers is very similar in effect to the slicking operation heretofore performed by hand.

*Slicker elevating and lowering mechanism.*

The slicker disc having been moved over the mold and the slicking operation completed the slicker must be raised a sufficient height to clear the mold and pallet thereon on the reverse or return trip to central position. This is accomplished as follows: The slicker shafts are provided with collars 240 and 241 at their respective upper ends, and at their lower ends with coil springs 242 and 243, these springs bearing against the carriage at one end and against the slicker discs at their opposite ends, and normally tending to resiliently maintain the slickers in lowered or operative position, in which position the shafts are supported by collars 294 and 295. A pair of rock arms 244 and 245, one for each slicker, are fixedly mounted on shafts 246 and 247, suitably supported at opposite ends of the carriage 170. These arms carry rollers 248 and 249 at their lower ends. Fixed to the shafts 246 and 247 are yokes 250 and 251 which straddle the upper ends of the respective slicker shafts, beneath the collars 240 and 241, in position to raise the said shafts when one of the rollers 248 or 249 rides up over one of the inclined projections 252 and 253 on opposite ends of the frame 1, (one such projection for each unit) according to which unit the operation described refers to. The slicker shaft and its disc is thus raised a sufficient height to clear the mold and pallet on the return trip. Pawls 254 and 255 mounted on shafts 256 and 257, fixed in suitable supports (not shown) on opposite ends of the carriage 170, normally hook over the shouldered projections 258 and 259 on the yokes 250 and 251, and lock the shafts in elevated position. Stops 260 and 261 are mounted on opposite ends of the frame in the path of movement of the depending arms 262 and 263 fixed on the respective shafts 256 and 257. The pawl 254 maintains the slicker shaft 227 locked in lifted position until the arm 262 trips on the projection 260, thereby releasing the pawl 254 and permitting the spring 242 to push the slicker downwardly on top of the mold in position to perform another slicking operation.

*Pallet clamping mechanism.*

The pallet having been placed on top of the mold by the pallet carrying and releasing mechanism previously described, the pallet is securely clamped to the mold by the mold clamps or latches 264 and 265, two of which are mounted on shaft 266 and two on shaft 267 on opposite sides of the mold carried by each mold support. The clamps are locked and unlocked through the medium of mechanism similar to that described in connection with the dump table operating mechanism. Assuming the pallet has been clamped in place and the mold support 89 swung over into position to deposit a brick upon the dump table the pallet latches will be unlocked as follows: The cam shaft 159 hereinbefore referred to, has a pair of spaced cams 268 and 269 fixed thereto, these cams being somewhat similar in shape to the dump table operating cams 161 and 162 on the same shaft. Rotation of the cam shaft 159 which is being continuously driven in a clockwise direction, causes the cams to alternately engage the rollers 270 and 271, on the bifurcations of a finger 272, freely mounted on finger shaft 158 previously described. This causes the finger 272 to be rocked to and fro on the finger shaft. In Figure 34 the cam 268 has engaged the roller 270 and has rocked the finger 272 in an anti-clockwise direction, thereby causing the pallet clamps or latches 264 and 265 to move to locked or Figure 35 position. This movement of the rock finger 272 in a clockwise direction is communicated to the pallet clamps or latches as follows: A connecting rod 273 connected at one end to the rock finger 272 and at its other end to the lower arm of a bell crank 274 on short shaft 275 is pulled to the right of Figure 34, thus rocking the bell crank 274 in an anti-clockwise direction. A second short shaft 276 is rocked in an anti-clockwise direction through the medium of a link 277 connected at opposite ends to the upper arm of the bell crank 274 and on arm 278 on the shaft 276. The shaft 276 has two upstanding fingers 279 and 280 fixed thereto, the latter of which engages a pin 281 on a rocker arm 282 in turn loosely mounted on the shaft 91 of the mold support 89. Engagement of the finger 280 with the pin 281 rocks the rock arm in a clockwise direction,—it being here noted that in the unlocking movement, that is when the cam 269 engages the roller 271 on rocker finger 272 the reverse of the action just described takes place, and the arm 279 engages the opposite side of the pin 281 on rocker arm 282, thus causing the latter to move in an anti-clockwise direction. Continuing the description of the operation of the mechanism in effecting the locking of the pallet clamps or latches 264—265, it will be noted that the rocker arm and the clamps or latches are operatively connected together as follows: A shaft 283 mounted in the mold support 89 has fixed thereto arms 284 and 285, positioned on opposite sides of said support. The arm 284 is connected to the rocker arm 282 by a link 286, and a link 287, connects the arm 285, with the upper end of a cross-arm, 290, fixed on the shaft 267, to which the pair of pallet clamps or latches 265 are attached. Consequently when the rock arm 282 is moved in a clockwise direction in the manner just described, the shaft 283 on which the arms 284 and 285 are fixed will be rotated in a clockwise direction and the link 287 by exerting a pull on arm 290, will actuate the pallet shaft 267 in a clockwise direction thus moving the latches 265 to open or unlocked position. The pallet latch shaft 266 upon which the companion latches 264 are fixed has an arm 289 fixed thereto, wh'ch is connected by a link 291, with the lower end of the cross arm 290. It therefore follows that movement of the latches 265 is accompanied by a corresponding action of the latches 264.

*Slicker carriage operating mechanism.*

The carriage 170 is propelled to and fro on the tracks 174 on the frame 1 by means of wire ropes 296, attached to one end of the carriage as at 297, and wire ropes 298 connected to the opposite end of the carriage as at 299. The ropes 296 are fixed at their opposite ends to drums 300 mounted on a shaft 301 journaled in bearing 288 in the tracks 174, and the ropes 298 at their opposite ends are fixed to drums 302 in turn mounted on a shaft 303 supported in bearings 292 on the tracks 174. Shaft 301 carries a bevel gear 304 at one end thereof which meshes with a bevel gear 305 loosely mounted on one end of a shaft 306, the other end of which has a bevel gear 307 also loosely mounted thereon which meshes with the bevel gear 308 on the drum shaft 303 previously referred to. (See Figures 40 and 40ᵃ). The shaft 306 is constantly rotated in an anti-clockwise direction by a shaft 309 having a bevel gear 310 at one end, meshing with a bevel gear 311 on the shaft 306. The shaft 309 has a bevel gear 312 at its opposite end which is in turn driven from the shaft 104, through bevel gear 313 in mesh with said bevel gear 312.

As the shaft 306 is being constantly driven, and the gears 305 and 307 thereon are normally idle, in order to effect movement of the carriage it is necessary to operatively couple these gears with the shaft 306. This is accomplished through the medium of clutches 314 and 315 on the shaft 306 being actuated to throw one or the other of the gears 305—307 into coupled position, it being understood that as one gear is thrown in the other will be thrown out at predetermined intervals in the movement of the carriage 170.

In the embodiment illustrated the clutch members 314 and 315 are slidable on the shaft 306 and coact respectively with the gears 305 and 307 to alternately fix and release the said gears on the shaft. The said clutch members 314 and 315 being automatically controlled preferably by the movement of the carriage 170.

It is necessary to provide for a momentary stop of the carriage 170 at central position to permit of the pallet fingers to release the pallet carried thereby and drop the same upon the mold directly therebeneath. This halting of the carriage is effected through the medium of a friction clutch 316 on shaft 306 being actuated at the proper time to disconnect the intermediate bevel gear 311 from shaft 306, thereby stopping the rotation of the latter. The clutch 316 is connected to a shaft 317 by means of a connecting rod 318, attached at one end to the clutch, and at its other end to a crank arm 319, on the shaft 317. A shaft 320 carrying a disc 321 is constantly rotated in an anti-clockwise direction by small gear 322 on shaft 309, meshing with large gear 323 on shaft 320. Bolted to the periphery of this disc 321 is a lug 324, which engages a rocker arm 325 fixed to the shaft 317, in the path of movement of said lug. This lug at each rotation of the disc 321 lifts the rocker arm, thus oscillating the shaft 317 in a clockwise direction, and causing the clutch 316 to be pulled, through the medium of the connecting rod 318 and crank 319, against the tension of coil springs 326, to open or disengaged position, permitting gear 311 to run idly on shaft 306.

The angle through which the shaft 317 is oscillated depends upon the depth of the lug 324. While the lug is in engagement with the rocker arm 325, the clutch 316 will be held in disengaged position, the duration of this engagement and the length of time the clutch remains disengaged depends upon the length of the lug. It will also be apparent that the time when this oscillation of the shaft 312 takes place, depends upon the location of the lug 324 upon the disc. Shifting of the lug in an anti-clockwise direction on the periphery of the disc advances the movement of the carriage and consequently advances the cycle of the slicker movements previously described. It therefore follows that adjustment of the lug on the disc in an opposite direction, delays the slicker movement in relation to the other synchronizing movements of the machine. In this way a fine adjustment may readily be had.

*Mold brushes.*

After a mold support has been swung over to dumping position and the brick therein has been deposited on the dump table and the latter is being moved down into position where the pallet and brick will be deposited upon the rope conveyor which conveys the brick to the drier, the projecting face of the heating pads or plates 133 carried by the plungers 131 for each mold (see Figure 36) are then cleaned by moving a rotating transversely shifting brush 327—327′ across the same beneath the inverted mold. It will be understood that there are two brushes for each unit, one brush for each mold, but only the pair for No. 1 unit will be described as follows:

Mounted on the base frame 149 are tracks 328 and 329 in which bearing blocks 330 and 331 are adapted to slide. The brush 327 is mounted on a sleeve 332, keyed for sliding movement on a brush shaft 333, supported at its ends in the blocks 330, while the brush 327' is mounted on a sleeve 334, which is keyed for sliding movement on a second brush shaft 335, supported at its end in the blocks 331. A pair of links 336 connect opposite ends of the brush shaft 333, with opposite ends of a shaft 337, which in turn is connected to the finger shaft 158 by arms 338. The ends of brush shaft 335 are connected to the ends of a shaft 339 by links 340, the latter in turn being connected to the shaft 211 by arms 342. Fixed to the finger shaft 158 are two spaced crank arms 392 and 343, these arms carrying at their ends the respective rollers 344 and 345, said rollers being alternately engaged by cams 346 and 347 on the cam shaft 159, the latter being continuously rotated in a clockwise direction as previously expained. It will be thus seen that when the cam 347 engages crank arm 392 the brush 327 will be given a rectilinear motion inwardly to center position across the mold pads or plates, and that it will be moved outwardly when the cam 346 engages the crank arm 343.

The shaft 211 also has two spaced crank arms 348 and 349 carrying at their ends rollers 350 and 351 respectively, which rollers are alternately engaged by cams 352 and 353 on the shaft 341, thus causing the brush 327' to be actuated in a similar manner to that of brush 327 just described. The shaft 211 is continuously driven from the main drive shaft 29 through gears 108, 109, shaft 107, gears 105, and 106, shaft 104, bevel gears 217, 218, shaft 216, bevel gears 214' and 215' and shaft 213 which carries gear 212 in mesh with gear 215 on shaft 211. (See Figure 1 and 1ª.)

In addition to the rectilinear motion of the brushes 327 and 327' just described, these brushes are given a vibratory motion in a direction parallel to the axis of the shafts on which they are mounted. The sliding sleeve upon which each brush is carried is formed at one end with a cam groove 354, in which seats a roller 355 on the end of a finger 356 attached to one of the brush bearing blocks previously described. As the brushes are rapidly rotated in a manner to be presently described the action of the roller 355 shifts the sleeve and consequently the brush very rapidly to and fro along its shaft, this imparting a more or less vibratory movement to the brush, coil springs 357 on opposite ends of the brush shafts helping to hold the brushes firmly and prevent chattering thereof.

Rotary movement of the brushes is obtained through sprocket and gear connections as follows: Loosely mounted on the shaft 337, is a sprocket 358, which is connected by a sprocket chain 359, to a sprocket 360, in turn loosely connected to the finger shaft 158, by means of a bushing 366. A second sprocket 361, also loosely mounted on the shaft 337, is connected by a sprocket chain 362, to a sprocket 363, fixed on the brush shaft 333. A sprocket 364 fixed to the bushing 366 on the finger shaft 158, is connected to the sprocket 365 fixed to the cam shaft 159. It will thus be seen that the continuously rotating cam shaft drives the brush shaft in an obvious manner.

Operation.

While it is thought that the operation of the machine will now be clear the following brief description of the general operation may not be amiss.

The mud from the bucket conveyors 6 is delivered by pivoted buckets 7 to the respective alternate hoppers 4 and 5, where it descends down the inclined plates and is trapped between the normally closed gates 22 and 23. By the time the charge has reached the lower end of the hopper, a mold support has been oscillated on its pivot to bring the particular mold carried thereby directly beneath the hopper, whereupon the gates 22 and 23 are rapidly opened, permitting the charge of mud trapped therebetween to precipitate into the mold. Just prior to the opening of the hopper plates, the splash plates are lowered into position to prevent splashing of the mud over adjacent parts of the machine. Steam or electricity is now turned on and the mold heated. The slicker carriage will at this time have brought one of the rotating slickers directly above the mold and the slicker shaft will have descended to lowermost position to bring the slicker into engagement with the brick. While the slicking operation is taking place, the pallet fingers will have picked up a pallet from the pallet conveyor, and as the slicker passes over the brick and the pallet carrier assumes the position previously occupied by the slicker, the slicker carriage is momentarily halted, and the pallet fingers open to deposit the pallet upon the bricks. The pallet is then clamped to the mold by the mold clamps or latches 264 and 265, carried by the mold, these clamps being actuated by the spaced cams 268 and 269 on the cam shaft 169. The mold is now inverted as a dump table is elevated to receive the inverted pallet and brick, the mold clamps are released, and the brick is ejected from the mold by the precipitating action of the plunger block and plungers carried thereby. The dump table now descends until the ropes of one of the conveyors 375—375' engages beneath the descending pallet and lifts the pallet with the brick thereon, off of the dump table. As the table is descending the mold brushes are brought into action and the projecting face of the heating pads are cleaned by the rotating-shifting or vibratory action of the brushes.

Having thus described our invention what we claim as our invention is:

1. A brick making machine comprising a frame, having a hopper therein, means for feeding mud to the hopper, said hopper having gates therein for trapping the mud fed to the hopper, a mold support mounted for oscillatory movement in said frame, an open ended mold carried by the mold support, movable splash plates mounted in the frame adjacent the mold support, means for oscillating the mold support to bring the mold into alinement with said hopper, and means for simultaneously opening the gates of the hopper and for moving said splash plates to operative position.

2. A brick making machine comprising a frame, a hopper mounted in said frame, means for feeding mud to the hopper, gates pivoted at their upper ends in said hopper, said gates adapted to trap the mud fed into said hopper, a movable mold support and mold carried thereby, means for simultaneously moving said support to bring the mold into alinement with the hopper and for opening said gates to release the trapped mud therein.

3. A brick making machine comprising a frame, a hopper for said frame, means for feeding mud to the hopper, said hopper having fixed inwardly inclined plates for absorbing the shock of the charge of mud fed thereto, gates pivoted at their upper ends in said hopper at one side of the lower ends of said plates, means for locking said gates closed while a charge of mud is being fed thereto, a mold support, means for moving said mold support and the mold carried thereby into alinement with said hopper, and means for simultaneously opening said gates as said mold is moved to said alined position.

4. A brick making machine comprising a frame, a hopper mounted in the frame, means for feeding mud to the hopper, a movable mold support and mold carried thereby, means for moving said support to bring said mold beneath said hopper to receive said charge of mud, a vertically movable dump table, a movable carriage on said frame, pallet pick-up fingers on said carriage, means for feeding pallets to said fingers, means for actuating said fingers to cause the fingers to grasp a pallet, means for elevating said dump table into position to receive said pallet, means for moving said carriage to bring said pallet fingers and pallet carried thereby over said mold, means for causing said fingers to release and deposit said pallet on top of said mold, and brick therein, means for inverting said mold to deposit said pallet and brick upon the vertically movable dump table, a conveyor, and means for lowering said dump table to bring said pallet into engagement with said conveyor.

5. In a brick making machine, a mold support and mold carried thereby, a hopper, inclined plates for directing a charge of mud down through said hopper to said mold to form a brick therein, a pair of shafts in said hopper, a gear fixed to each of said shafts, said gears being in mesh one with the other, a pair of gates fixed to said shafts, said gates converging at their lower ends and adapted to trap the material fed to said hopper, means for actuating said gates to open the same, said actuating means locking said gears when said gates are in closed position.

6. In a brick making machine, a hopper and a mold, a conveyor for feeding a charge of mud to said hopper in excess of that required to fill the mold, one lead of the conveyor being positioned to catch the excess material and return the same to the hopper.

7. In a brick making machine, pivoted mold supports, automatic means for rocking the mold supports to filling and dumping positions respectively, a rocking dump table support, a dump table attached to each end of said last mentioned support, and automatic means for rocking said support to alternately bring said tables toward said mold supports.

8. A brick making machine including material feeding mechanism embodying a material conveyor, and a valved hopper to receive material therefrom, a mold swingable to and from positions to receive material from the hopper and deliver the brick from the mold, said mold having a plunger, means for automatically opening and closing the hopper valve when said mold is accordingly swung to said receiving and delivering positions, means for conveying the brick from the mold, means for heating the plunger, mechanism for automatically slicking the brick, and means for automatically brushing the plunger.

9. A brick making machine including material feeding mechanism embodying a material conveyor, and a valved hopper to receive material therefrom, a mold swingable to and from positions to receive material from the hopper and deliver the brick from the mold, means for automatically opening and closing the hopper valve when said mold is accordingly swung to said receiving and delivering positions, automatic means for conveying the brick from the mold, means for heating the mold and mechanism for automatically slicking the brick.

10. A brick making machine including material feeding mechanism embodying a material conveyor, and a valved hopper to receive material therefrom, a mold swingable to and from positions to receive material from the hopper and deliver the brick from the mold, means for automatically opening and closing the hopper valve when said mold is accordingly swung to said receiving and delivering positions, means for conveying the brick from the mold and means for heating the mold.

11. A brick making machine including material feeding mechanism embodying a material conveyor, and a valved hopper to receive material therefrom, a mold swingable to and from positions to receive material from the hopper and deliver the brick from the mold, means for automatically opening and closing the hopper valve when said mold is accordingly swung to said receiving and delivering positions, and means for conveying the brick from the mold.

12. A brick making machine including material feeding mechanism, a mold swingable to and from positions to receive material therefrom and eject brick from the mold, automatic means for conveying the ejected brick from the mold, means for heating the mold and mechanism for automatically slicking the brick.

13. A brick making machine including material feeding mechanism, a mold swingable vertically to and from positions to receive material from said mechanism and eject brick from the mold, said mold having a plunger, means for conveying brick from the mold, means for heating the plunger, mechanism for automatically slicking the brick and means for automatically brushing the plunger.

14. A brick making machine including a material feeding mechanism, a pair of brick ejecting molds alternately automatically swingable to and from a common position to receive material from said mechanism and to different positions to eject the brick, means for automatically conveying the ejected brick from said ejecting positions and means for automatically slicking the brick while the molds are normally positioned.

15. The method of making brick consisting in forming a brick in a mold, mechanically ejecting the brick therefrom, and then subjecting the ejecting means to a rotating shifting brushing action to clean adhering material from the ejecting means.

In testimony whereof we affix our signature in presence of two witnesses.

ROY P. M. DAVIS.
IRVIN F. HEPLER.

Witnesses:
ERMA A. ROSENSTEEL,
V. L. WALLETT.